Nov. 13, 1951 J. H. VOSS 2,574,944

ALL RELAY AUTOMATIC TELEPHONE SYSTEM TRUNK SELECTION

Filed Dec. 10, 1947 13 Sheets-Sheet 1

INVENTOR.
JOHN H. VOSS

BY Chas. W. Candy

ATTORNEY

Nov. 13, 1951 J. H. VOSS 2,574,944

ALL RELAY AUTOMATIC TELEPHONE SYSTEM TRUNK SELECTION

Filed Dec. 10, 1947 13 Sheets-Sheet 2

INVENTOR.
JOHN H. VOSS

BY [signature]

ATTORNEY

ALL RELAY AUTOMATIC TELEPHONE SYSTEM TRUNK SELECTION

Filed Dec. 10, 1947 13 Sheets-Sheet 3

INVENTOR.
JOHN H. VOSS

BY

ATTORNEY

INVENTOR.
JOHN H. VOSS
BY
Chas. W. Candy
ATTORNEY

INVENTOR.
JOHN H. VOSS
BY
Chas. Lee Candy
ATTORNEY

Nov. 13, 1951 J. H. VOSS 2,574,944

ALL RELAY AUTOMATIC TELEPHONE SYSTEM TRUNK SELECTION

Filed Dec. 10, 1947 13 Sheets-Sheet 6

INVENTOR.
JOHN H. VOSS
BY

ATTORNEY

ALL RELAY AUTOMATIC TELEPHONE SYSTEM TRUNK SELECTION

Filed Dec. 10, 1947 13 Sheets-Sheet 7

INVENTOR.
JOHN H. VOSS

BY Chas. W. Cowdy

ATTORNEY

Nov. 13, 1951 J. H. VOSS 2,574,944

ALL RELAY AUTOMATIC TELEPHONE SYSTEM TRUNK SELECTION

Filed Dec. 10, 1947 13 Sheets-Sheet 8

INVENTOR.
JOHN H. VOSS

BY [signature]

ATTORNEY

ALL RELAY AUTOMATIC TELEPHONE SYSTEM TRUNK SELECTION

Filed Dec. 10, 1947 13 Sheets-Sheet 9

INVENTOR.
JOHN H. VOSS

BY Chas. W. Candy

ATTORNEY

Nov. 13, 1951 J. H. VOSS 2,574,944

ALL RELAY AUTOMATIC TELEPHONE SYSTEM TRUNK SELECTION

Filed Dec. 10, 1947 13 Sheets-Sheet 10

INVENTOR.
JOHN H. VOSS

BY Chas. W. Candy

ATTORNEY

Nov. 13, 1951 J. H. VOSS 2,574,944

ALL RELAY AUTOMATIC TELEPHONE SYSTEM TRUNK SELECTION

Filed Dec. 10, 1947 13 Sheets-Sheet 11

INVENTOR.
JOHN H. VOSS

BY Chas. Lu. Candy

ATTORNEY

Nov. 13, 1951 J. H. VOSS 2,574,944

ALL RELAY AUTOMATIC TELEPHONE SYSTEM TRUNK SELECTION

Filed Dec. 10, 1947 13 Sheets-Sheet 12

INVENTOR.
JOHN H. VOSS

BY Chas. L. Cassidy

ATTORNEY

Nov. 13, 1951 J. H. VOSS 2,574,944

ALL RELAY AUTOMATIC TELEPHONE SYSTEM TRUNK SELECTION

Filed Dec. 10, 1947 13 Sheets-Sheet 13

INVENTOR.
JOHN H. VOSS

BY [signature]

ATTORNEY

Patented Nov. 13, 1951 2,574,944

UNITED STATES PATENT OFFICE 2,574,944

ALL RELAY AUTOMATIC TELEPHONE SYSTEM TRUNK SELECTION

John H. Voss, Rochester, N. Y., assignor to Automatic Electric Laboratories, Inc., Chicago, Ill., a corporation of Delaware Application December 10, 1947, Serial No. 790,728

12 Claims. (Cl. 179—18)

Figure 1:
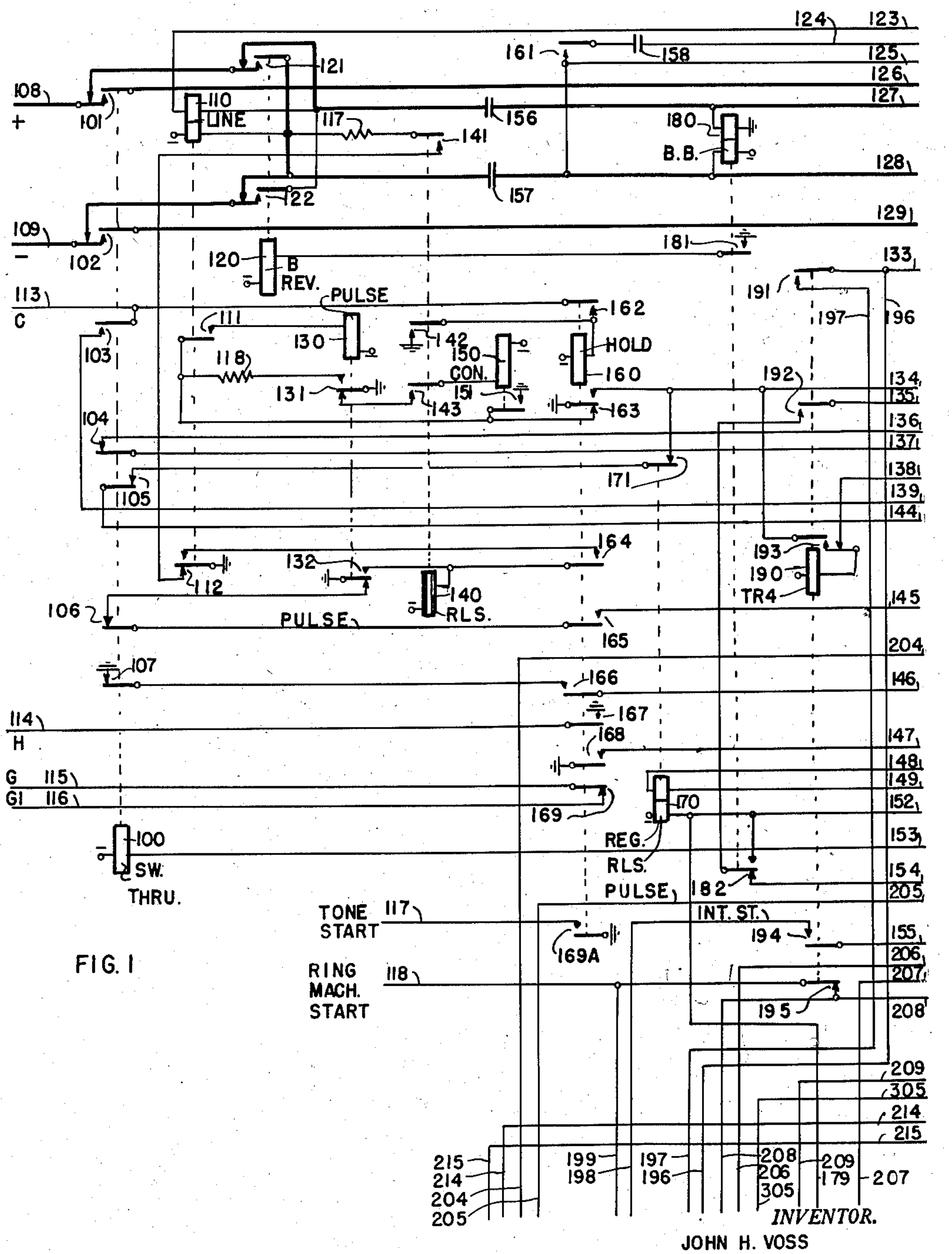

This invention relates in general to telephone systems, but more particularly to automatic telephone systems of the all-relay type generally similar to those shown and described in U. S. Patent 2,491,291 issued to Voss and Jones on December 13, 1949, and in Patent 2,535,764 issued to the same applicants on December 26, 1950, and is concerned especially with improvements in trunk selecting circuits for such systems. Other improvements in the trunk selecting equipment provided for such systems are described in my U. S. Patent 2,431,850 issued December 2, 1947, and re-issued as Re. 23,056 dated December 7, 1948, and in my Patent 2,541,624 issued February 13, 1951.

In the foregoing applications, a number of arrangements were shown for preselecting idle trunks by means of trunk selecting relays external to the main switches, which were seized as required by the selector or connector involved. On a call to a trunk, the dialling of the trunk group call number caused the operation of the group relay involved in the calling switch, and the seizure of the associated trunk selecting relays. The trunk selecting relays thereupon automatically caused the operation of the required units relays of the switch, to extend the call to the preselected trunk in the called trunk group. Upon the operation of the units relay, the trunk selecting equipment was immediately released. In the foregoing applications however, the various trunk groups were limited to a maximum of ten trunks, in all cases.

The main object of the present invention is accordingly to provide a basically similar arrangement which will permit automatic selection in this manner of idle trunks in larger trunk groups, having more than ten trunks. Another object of the invention is the application of this same idea to the selection of both regular trunks and P. B. X trunks, which normally use different types of call numbers.

One feature of the invention is therefore the use of large trunk groups having a common call number, the trunks of which are connected to the contacts of as many group relays as are required to provide the necessary outlets. Theoretically, the size of these trunk groups is limited only by the number of group relays available in a switch, but practically, it is, of course, limited by general traffic requirements, volume of traffic to the group, and like considerations.

Another feature of the invention is the provision of large groups of trunk select relays, comparable in size with the size of the associated trunk group, said select relays being seized from a calling switch through one or more groups of trunk access relays as required.

Another feature is the control from the trunk select relays, of group marking conductors as well as units marking conductors, so that the setting of these relays marks both the group relay and the units relay to be operated in the calling switch, to extend the call to the preselected trunk. On a call to such a trunk group therefore, the dialling of the trunk group call number does not operate a group relay, but merely seizes the special trunk select relays, which quickly operate the required group and units relays, and are then freed. On other calls, the group relays are operated in the usual manner direct from the counting relays, in response to the dial pulses.

Figure 12:
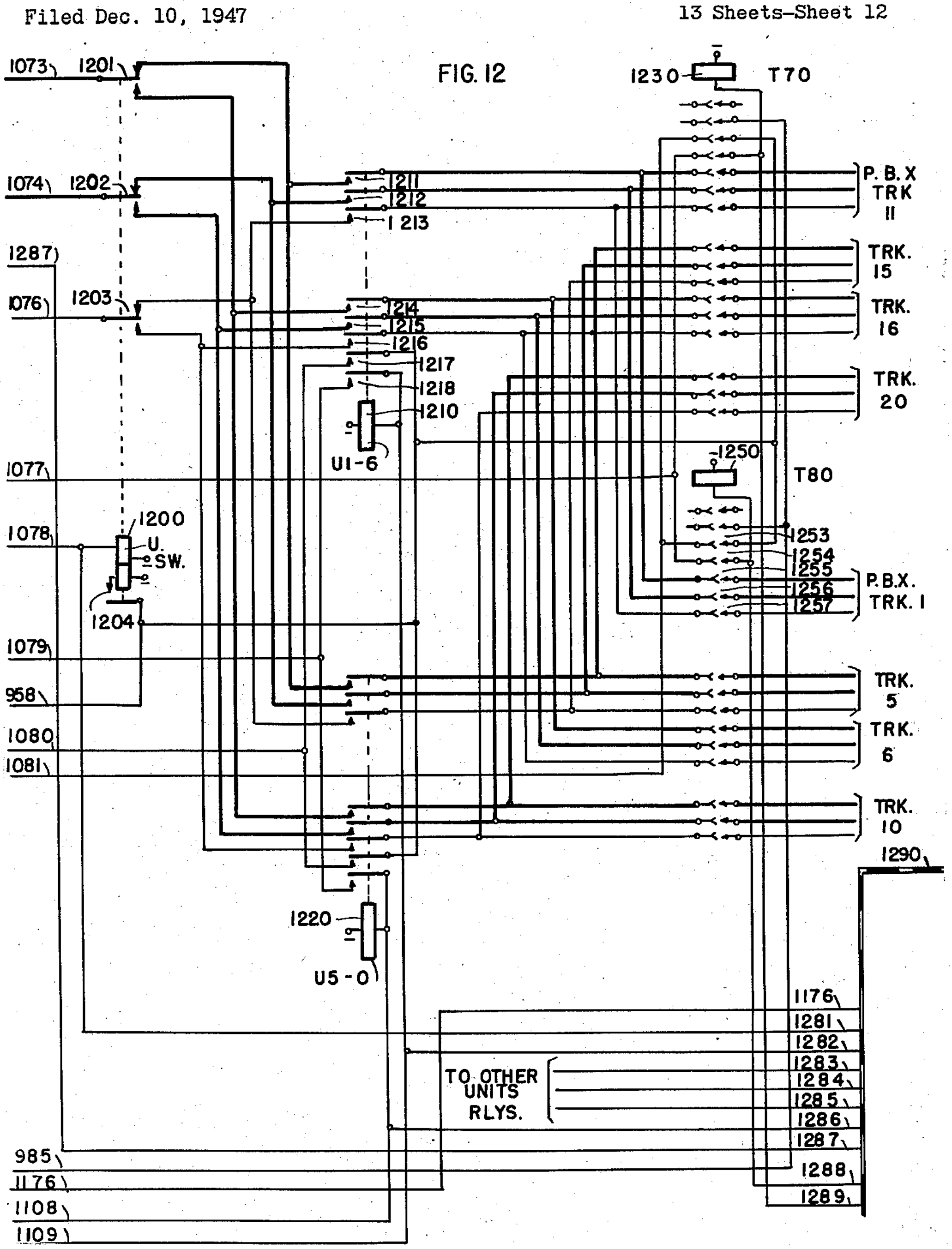
Figures 13, 14, 15:
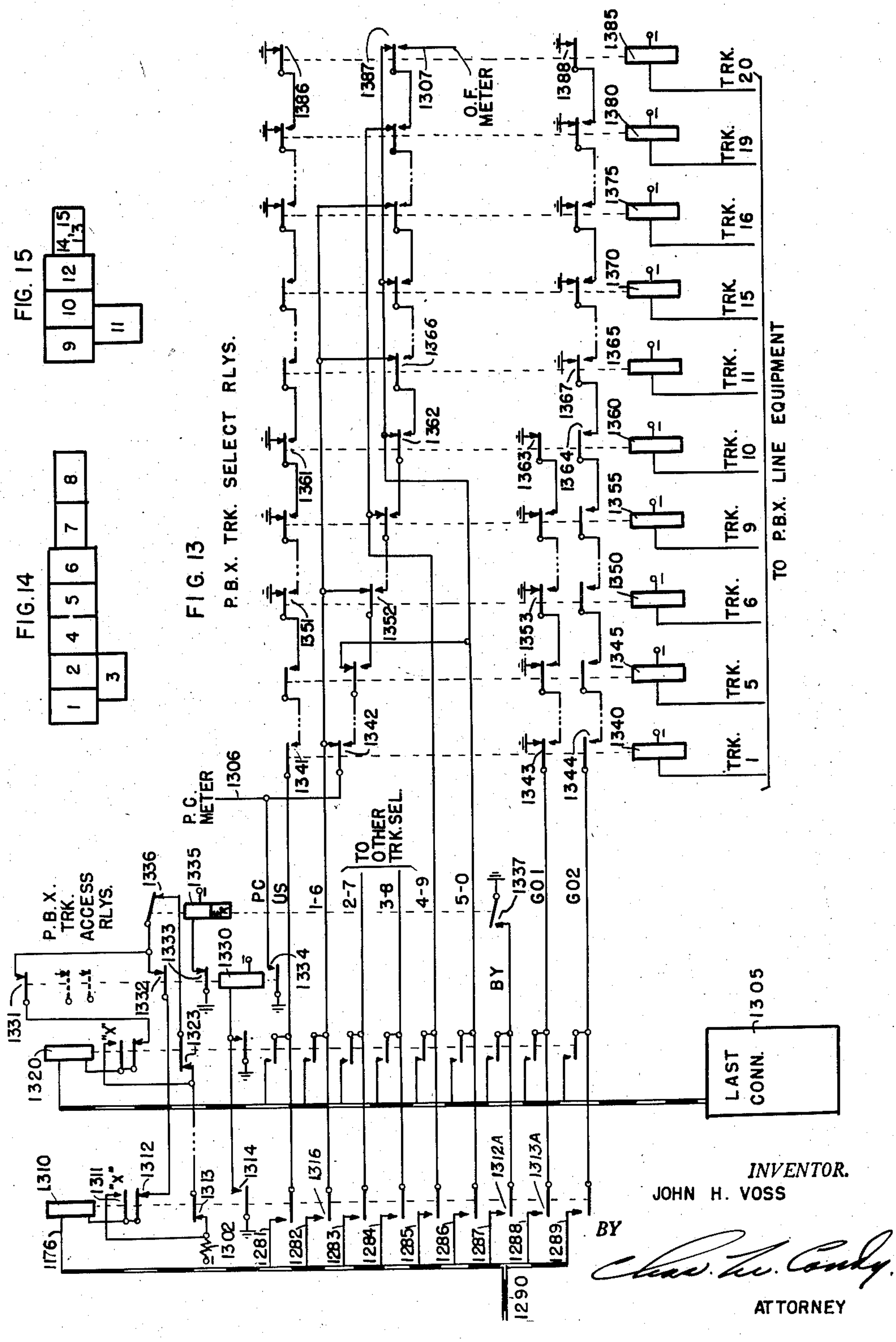

Other objects and features of the invention will be apparent from the description and claims which follow, when considered in conjunction with the appended drawings, comprising Figures 1 to 13 inclusive, which when arranged as indicated in Figures 14 and 15, show sufficient of the equipment of a typical telephone system of this type to illustrate the invention.

With further reference to the drawings, Figures 1 to 8 inclusive show the invention used for the selection of toll or inter-office trunks in a relay-type connector system such as described in the previously mentioned Patent 2,491,291, while Figures 9 to 13 inclusive show the invention applied to the selection of P. B. X trunks in a relay-type selector system such as that described in the previously mentioned Patent 2.535,764.

Thus Figures 1 to 4 inclusive show a 200-line all-relay code ringing connector similar to that shown in said Patent 2,491,291, but with many of the special service features removed, in the interests of simplicity, while Figures 5 to 8 inclusive show the trunk selecting equipment required to handle two 20-trunk groups in the manner outlined. Likewise, Figures 9 to 12 show a simplified 100-line, harmonic ringing connector, generally similar except for the ringing to that shown in Patent 2,535,764, while Figure 13 shows the trunk selecting equipment required to handle a 20-trunk P. B. X group assumed to be associated with this connector. Harmonic ringing has been provided for this connector to show the ease with which these connectors may be changed from code to harmonic ringing and vice versa, by a few simple wiring changes.

It should be understood, of course, that the arrangements shown are typical only, and that many other combinations and groupings may be made without departing from the sense or scope of the invention. It will be readily apparent, for example, that the trunk groups involved may be contracted to less than 20 trunks or expanded to include an indefinite number of trunks, that more than two such large trunk groups may be employed if necessary, that large inter-office trunk groups and large P. B. X trunk groups may be served from the same connector, that smaller trunk groups may also be employed with the group relays involved in such case operated from the counting relays in the usual manner, and that the invention in so far as it concerns inter-office trunks, may be applied to selectors as well as connectors.

With reference to the drawings in more detail, Figure 1 shows the incoming end of the 200-line connector, including ten relays numbered 100 to 190 inclusive, and six conductors on the left which are assumed to be connected to an associated linefinder, not shown, but similar to that illustrated in the said Patent 2,491,291. The conductors 108 and 109 are the talking or "line" conductors over which the connector is seized as soon as the associated finder has been taken into use by a calling line, conductor 113 is the "test" or "control" conductor, over which the connector returns ground upon seizure to clear the calling line equipment from the line, conductor 114 is the "hold" conductor over which the connector holds the linefinder after the release of the call allotter, not shown, and conductors 115 and 116 are "link busying" conductors which, when open at the connector, make this link busy to the call allotter. As to the various relays indicated on this sheet, relay 100 is a "switch-through" relay which operates on a call to a trunk to switch the call through to a trunk repeater free of condensers, relay 110 is the connector "line" relay, relay 120 is a "battery reversing" relay, relay 130 is a "pulsing" relay controlled from the line relay, relay 140 is the "release" relay, relay 150 is a "pulse control" relay which controls the re-operation of the pulsing relay, relay 160 is the "hold" relay, relay 170 is the "register release" relay, relay 180 is the "back-bridge" relay, which controls the battery reversing relay, and relay 190 is a "ringing digit transfer" relay which operates on the last digit to start the ringing.

Figure 2:
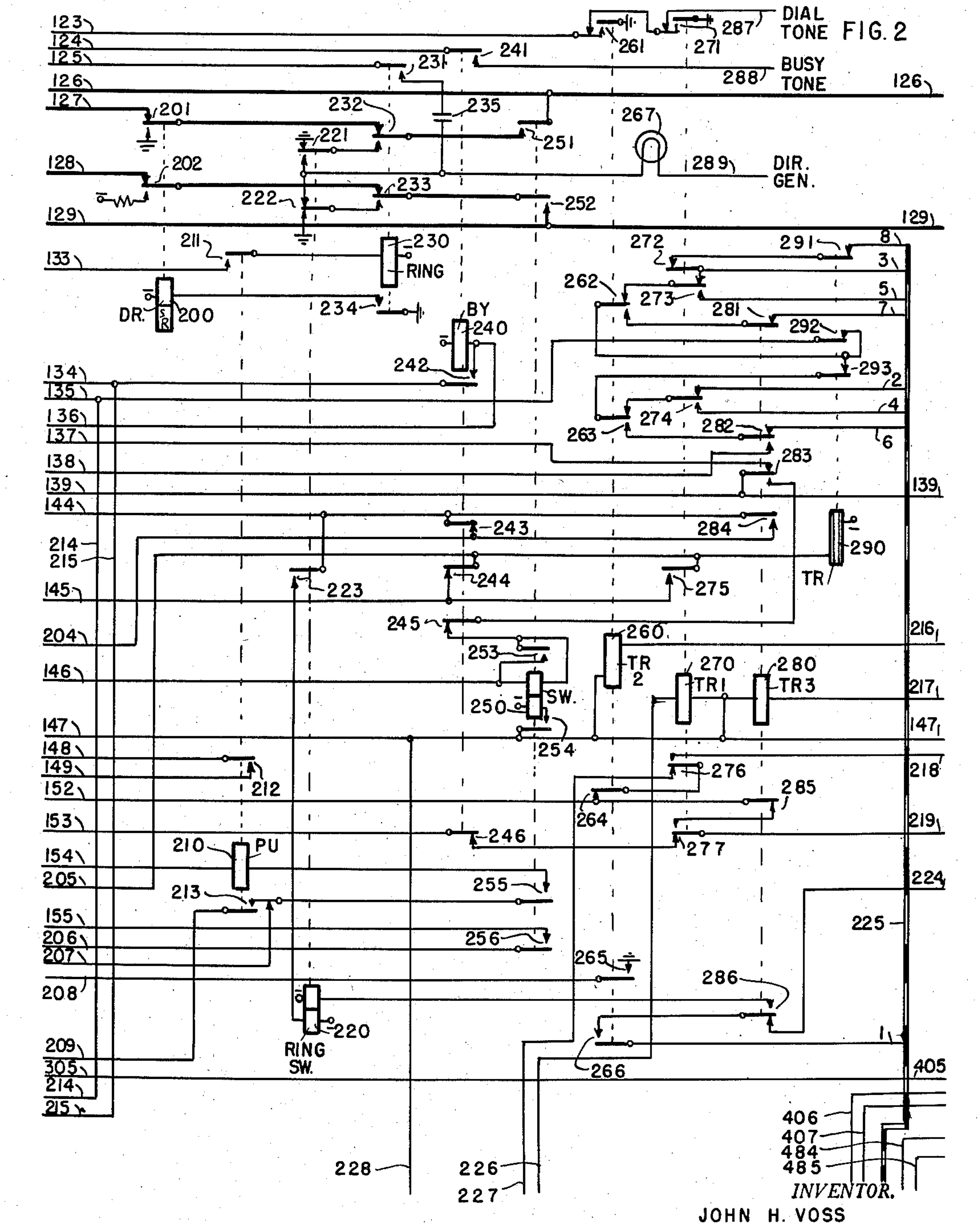

In Figure 2 are shown additional miscellaneous control relays for this connector including a "drain" relay 200, a "ring pickup" relay 210 which operates and releases during the ringing to mark the start and end of each ringing cycle, a "ring switching" relay 220 which determines the side of the line to which the ringing current is applied, a "ringing" relay 230, a "busy" relay 240, a "switching" relay 250, three "digit transfer" relays 260, 270 and 280 which operate after the second, first and third digits, respectively, to prepare circuits for the following digit, and a "dialling transfer" relay 290 which operates at the start of each digit and releases at the end of each digit to prepare the operate circuits controlled by the counting relays.

Figure 3:
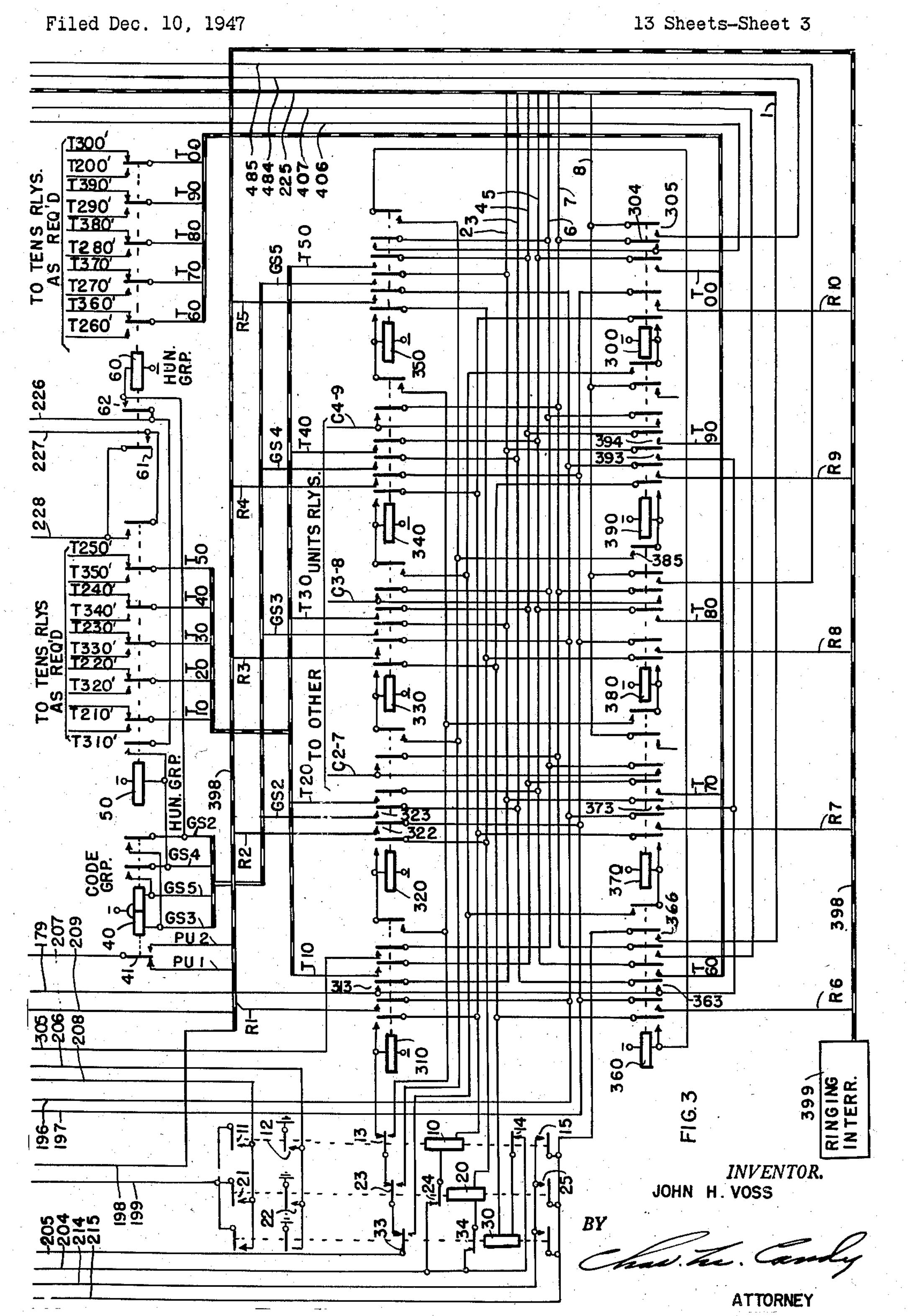

Figure 3 shows the digit register, comprising ten "counting" relays numbered 310 and 300 inclusive which follow the pulses of each dialled digit to control the connector, and three "counting control" relays on the left side of the sheet numbered 10, 20, and 30, which also follow the pulses to switch the pulsing lead to the various counting relays in succession. In the upper part of this sheet are also shown a "code group select"

relay 40 which operates from the counting relays on a first digit "3" or "5" to select the second ten ringing codes where 20-party lines are used, a "hundreds group select" relay 50 which operates on a first digit "4" or "5" to select the second hundred lines, and a "hundreds group select" relay 60 which operates on a first digit "2" or "3" to select the first hundred lines.

Figure 4:
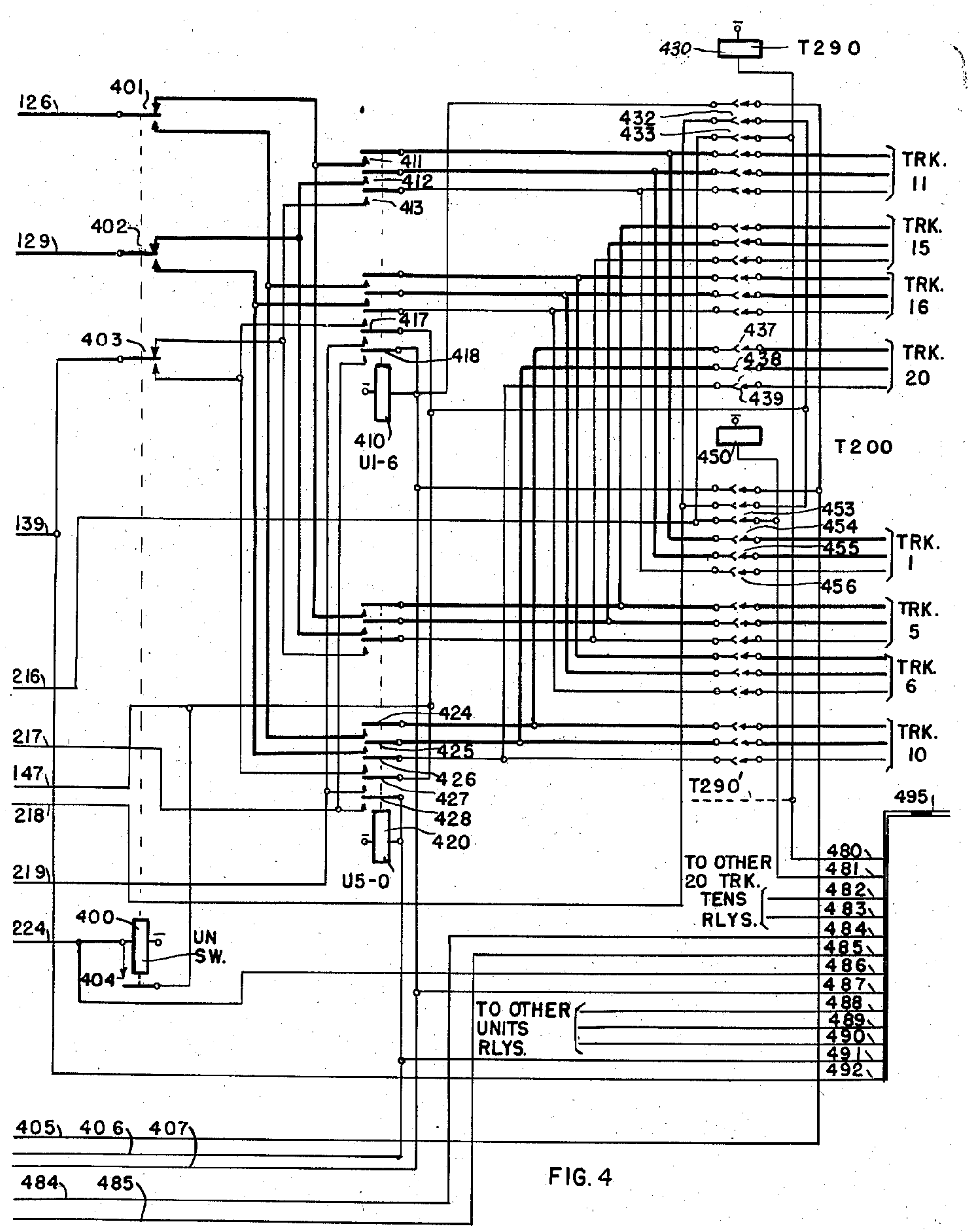

In Figure 4, relay 400 is the "units switching" relay, relays 410 and 420 are two of the five "units" relays, and relays 430 and 450 are two of the twenty "tens" or "group" relays which would be required for a full two hundred lines. These lines are connected to the terminals of the tens relays, each of which has a capacity of ten lines or trunks. The units switching relay divides each of these ten line groups into two sub-groups comprising lines 1 to 5 and 6 to 0 respectively, and when normal selects the low numbered sub-group, and when operated selects the high numbered sub-group. Each units relay accordingly serves to select two lines, one in each sub-group. Thus relay 410 when operated, will select line 1 if relay 400 is normal and line 6 if relay 400 is operated, while relay 420 will select lines 5 or 0 similarly. The other units relays, not shown, select lines 2 or 7, lines 3 or 8, and lines 4 or 9 respectively, in like manner. The two tens relays of this figure are assumed to be connected to the trunks of the first 20-trunk group.

Figure 5:
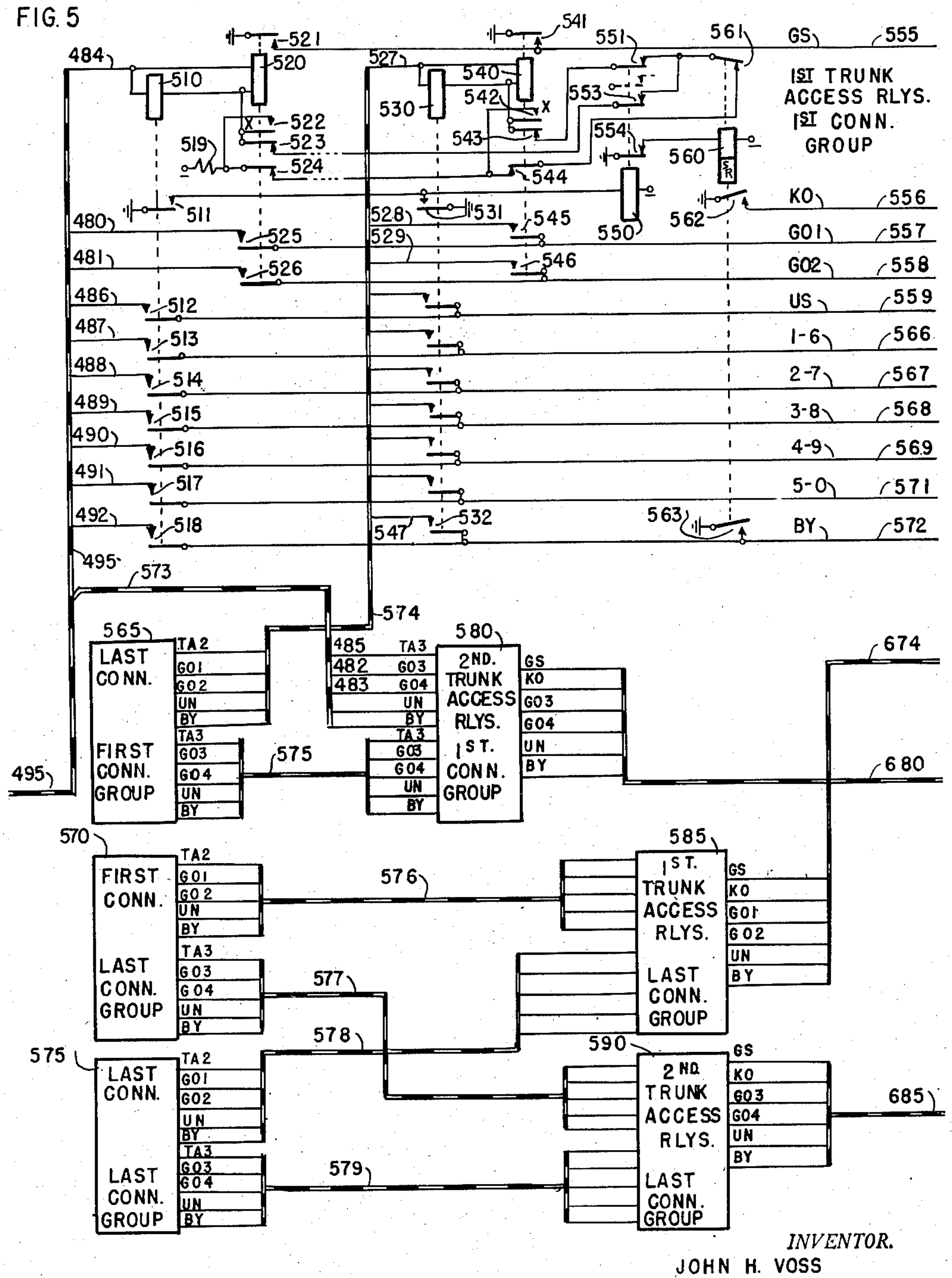

In the upper part of Figure 5 is shown one of the groups of trunk access relays associated with the first connector group, two connector groups being assumed in this instance. In this and the other trunk access groups, one pair of "access" relays such as 510 and 520 is provided for each connector in the connector group, the foregoing relays for example, being associated with the first connector of the first connector group shown in Figures 1 to 4, and relays 530 and 540 being associated with the last connector of this group indicated by the rectangle 565 at the lower left. The intervening connectors and the intervening access relays are not shown. These access relays operate momentarily when seized by the associated connector on a call to a 20-trunk trunk group and extend the units-marking and busy conductors and the involved tens-marking conductors from the calling switch to a first group of trunk group relays such as shown in the upper part of Figure 6. Relay 550 is a "lockout" relay which operates when any pair of access relays in this group operate, to open the operate circuit of the other access relays of the group momentarily, and relay 560 is a normally energized "kickoff" relay which releases if a call is not switched through promptly to cause the giving of a busy signal and the preselection of the next idle trunk. In the lower part of Figure 5 the rectangle 580 represents a second group of trunk access relays associated with the first connector group, for giving access to a second group of trunk group relays such as indicated by the rectangle 690 in the lower part of Figure 6. Also shown in the lower part of Figure 5 are the rectangles 570, 575, 585 and 590 representing respectively the first and last connectors of the second connector group, and first and second trunk access relays associated therewith for giving access therefrom, to the trunk group relays of Figure 6. For all practical purposes each pair of access relays such as 510 and 520, may be considered as a single relay, and could be replaced by a suitable multi-contact relay.

Figure 6:
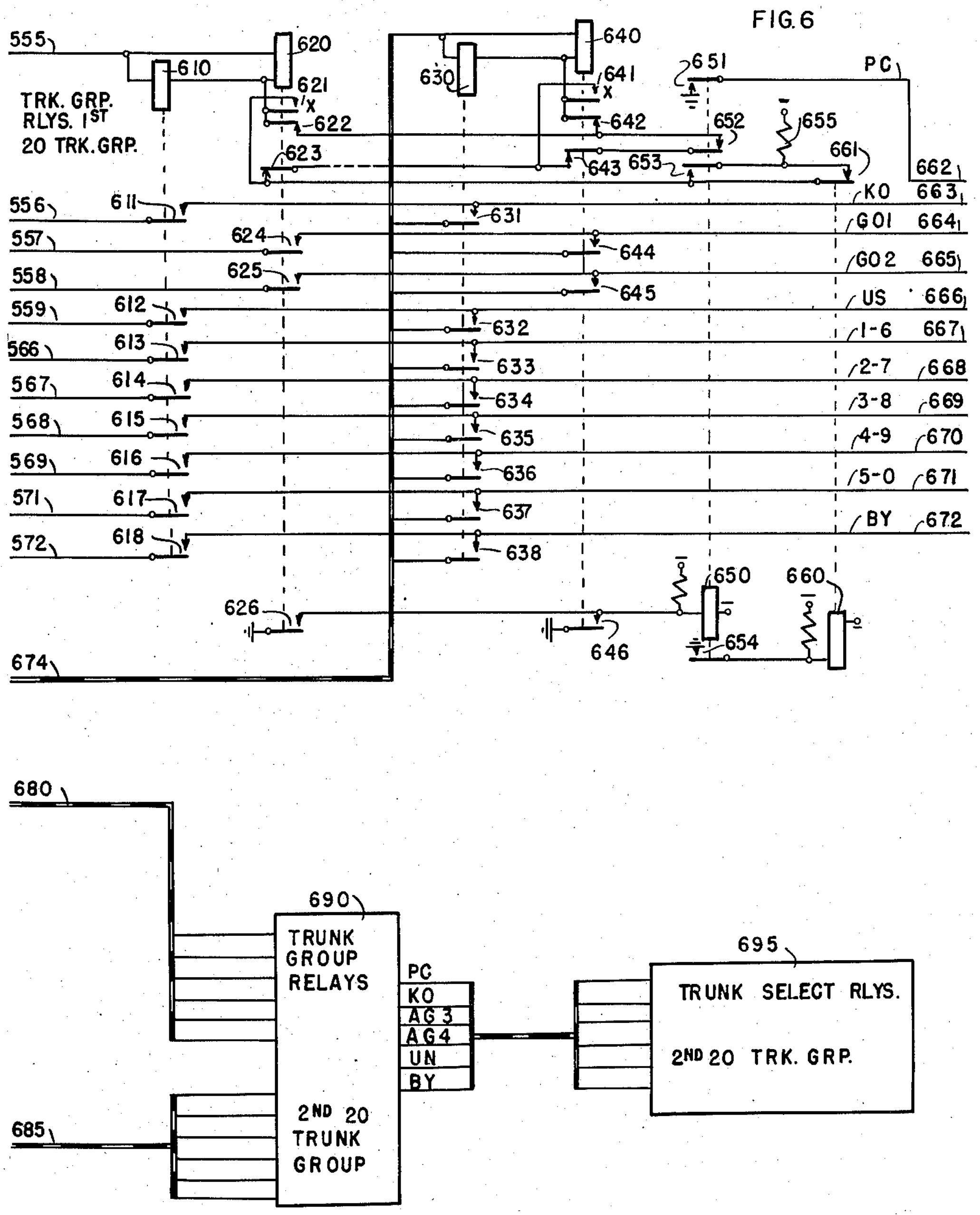
Figure 7:
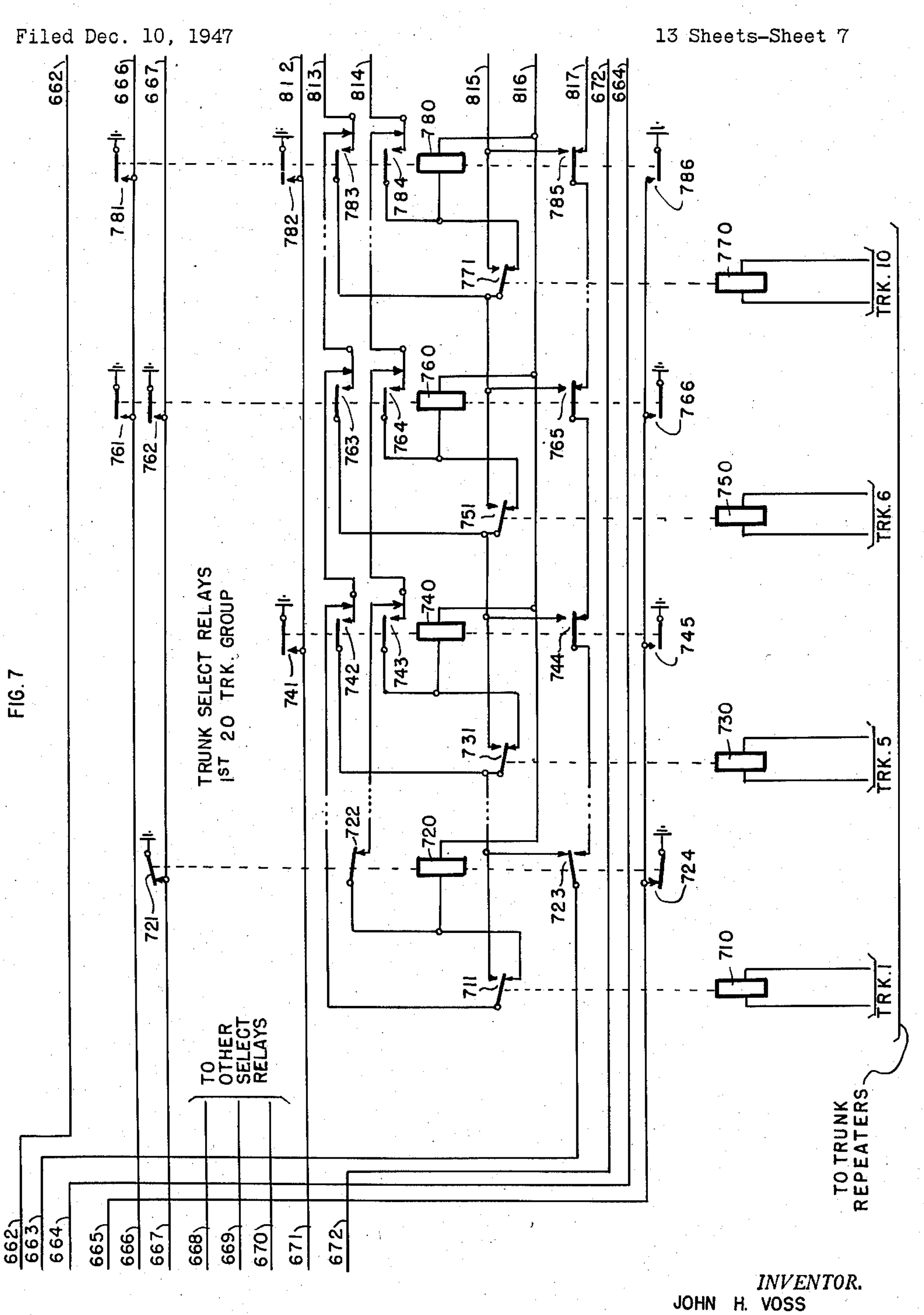
Figure 8:
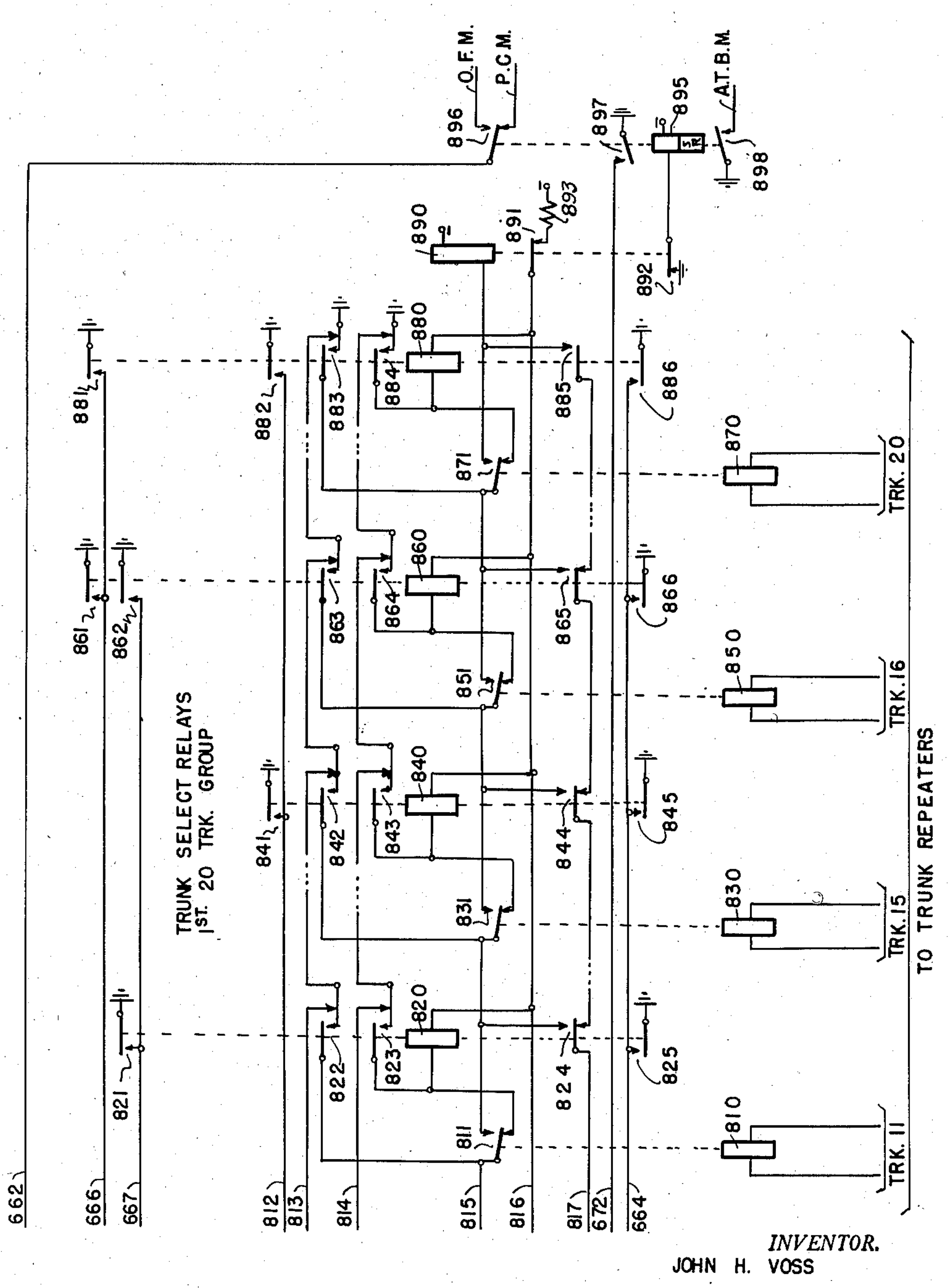

In the upper part of Figure 6 are shown the trunk group relays associated with the trunk select relays which serve the first 20-trunk trunk group, such as shown in Figures 7 and 8. In these trunk group relays, a pair of group relays such as 610 and 620 is provided for each group of connectors. These relay pairs, which are doubled up like the access relays only to reduce the spring load, and thus may be also considered as single relays, are operated from the associated trunk access relays, and serve to extend the tens and units marking conductors and the busy and kick-off conductors from the seizing trunk access relays to the associated trunk select relays. Thus relays 610 and 620 operate from the first trunk access relays of the first connector group in the upper part of Figure 5, while relays 630 and 640 operate from the first trunk access relays of the second connector group, as represented by the rectangle 585 in Figure 5, to extend the respective marking and control conductors therefrom to the first trunk select relays of Figures 7 and 8. Relays 650 and 660 are "lockout" relays, which operate whenever any pair of group relays in this group operate, and open the operate circuit of the other group relays momentarily. The rectangle 690 in the lower part of Figure 6 represents an identical group of trunk group relays controlled from the trunk access relays 580 and 590, and serve to extend the marking and control conductors therefrom to the second group of trunk preselect relays, here represented by the rectangle 695, assumed to be identical with Figures 7 and 8. This arrangement permits making simultaneous calls to both large trunk groups without conflict.

In Figures 7 and 8, which as already stated show the trunk select relays for the first 20-trunk group, a "trunk busy" relay such as 710 or 810 is provided for each trunk in the trunk group. Each of these relays is normally operated through break contacts in the associated trunk repeater, and releases whenever the associated trunk is seized by a call, or otherwise made busy. A "preselect" relay such as 720 or 820 is also provided for each trunk in the group. These relays operate one at a time, in rotation, under the control of the trunk busy relays, as the trunks are taken into use, to preselect the next idle trunk. As each preselect relay operates, it releases the preceding relay and prepares operate circuits for the proper tens and units relays in the calling connector. Relay 890 is the "reset" relay which operates when the last trunk is taken into use, to reset the preselect chain, and relay 895 is a normally operated "all-trunks-busy" relay, controlled from the reset relay. Preselect and busy relays are shown for the 1st, 5th, 6th, 10th, 11th, 15th, 16th and 20th trunks only, the omitted relays being identical with those shown, except for the units marking connections.

Figure 9:
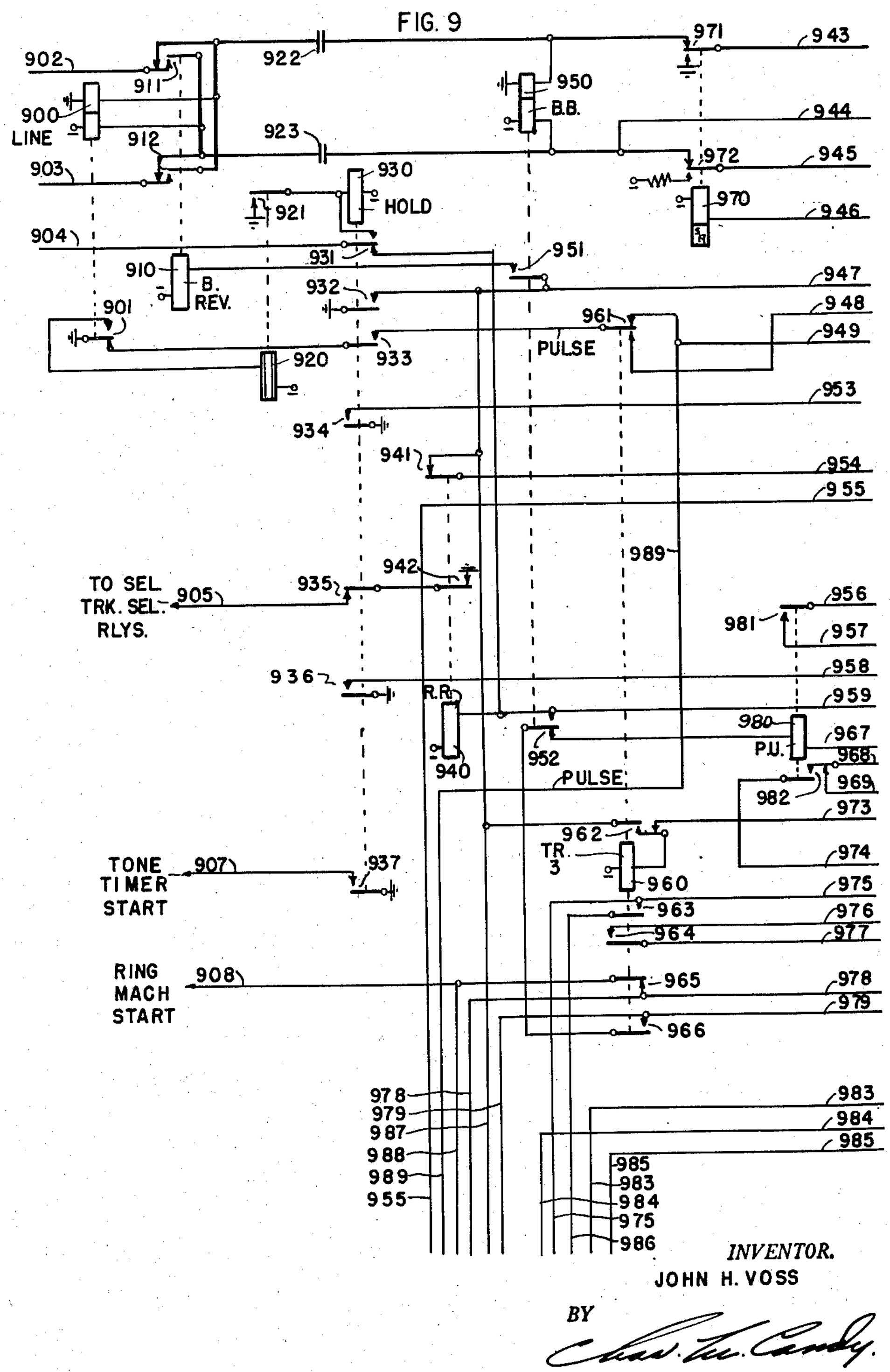

Figure 9 shows the incoming end of the 100 line connector, including nine relays numbered 900 to 980 inclusive, and three incoming talking and test conductors at the upper left, which are assumed to be connected to the terminals of an associated selector not shown, but similar to that shown and described in the said Patent 2,535,764. The relay 900 is the connector "line" relay, relay 910 is a "battery reversing" relay, controlled from the back bridge relay, relay 920 is the "release" relay, relay 930 is the "hold" relay, relay 940 is the "register release" relay, 950 is the "back-bridge" relay, 960 is the "ring start" relay, 970 is the "drain" relay and 980 is the "ring pickup" relay.

Figure 10:
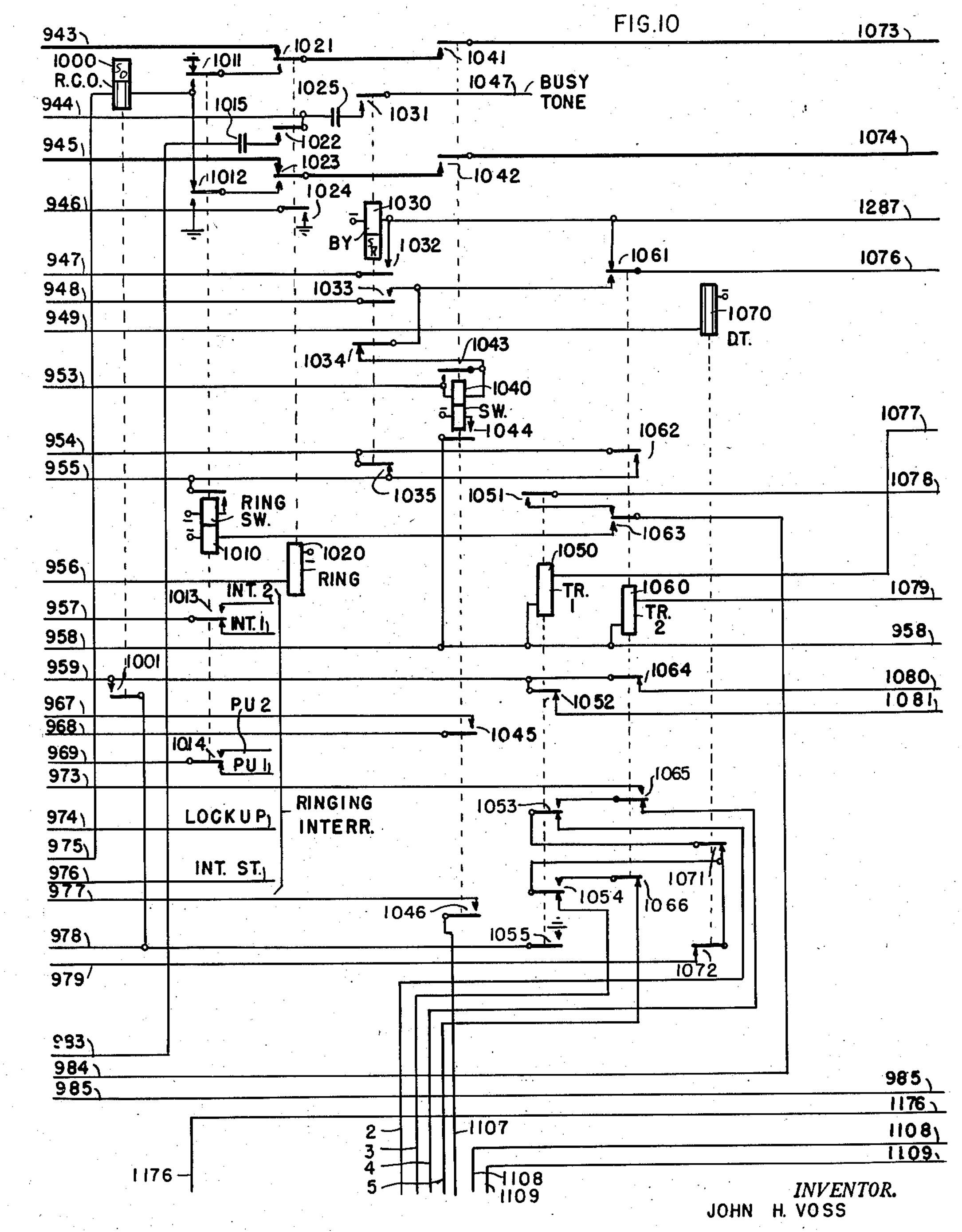

Figure 10 shows eight other miscellaneous control relays for this connector, numbered 1000 to 1070 inclusive. Relay 1000 is a "ring cut-off" relay, 1010 is a "ring switching" relay which determines the side of the line to be rung, and also the number of rings, in cases where one and two-ring codes are required for 10-party lines having the ringers all connected across the line, relay 1020 is the "ringing" relay, controlled from the interrupter, 1030 is the "busy" relay, and 1040 the "switching" relay. Relays 1050 and 1060 are "digit transfer" relays which operate after the first and second digits respectively to prepare the circuits for the following digit, and relay 1070 is the "dialling transfer" relay whose function is similar to that of relay 290 in Figure 2.

Figure 11:
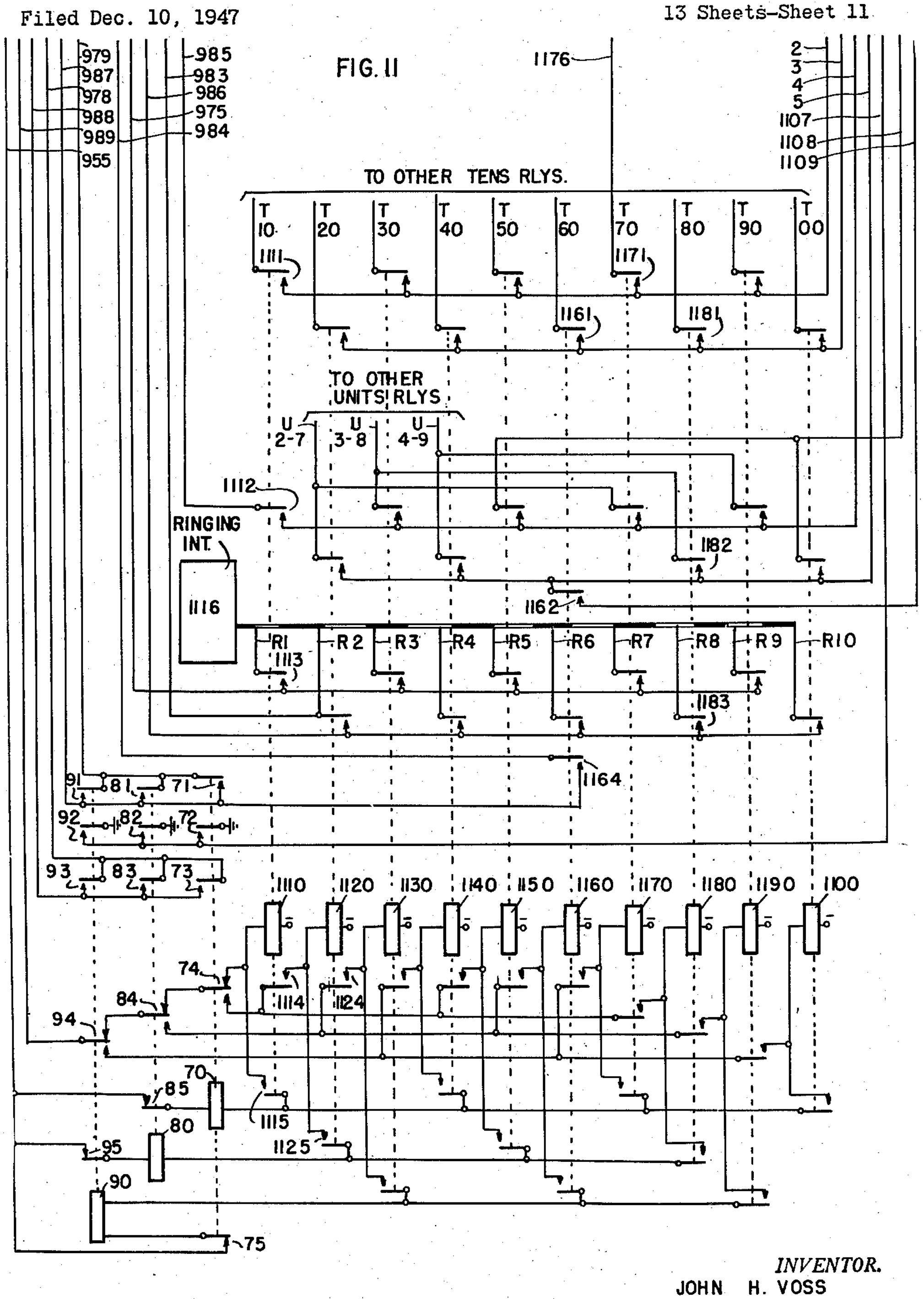

Figure 11 shows the digit register for this connector comprising ten "counting" relays numbered from 1110 to 1100 and three "counting control" relays at the lower left numbered 70, 80, and 90. These register relays are similar to those of Figure 3 and operate similarly, although they are drawn in a different way, as a matter of convenience. Since this is a 100-line connector, group switching relays, such as the relays 50 and 60 of Figure 3 are not required.

Figure 12 shows the tens and units relays for this connector, which are similar to those of Figure 4, relay 1200 being the "units switching" relay, relays 1210 and 1220 being the 1—6 and 5—0 "units" relays respectively, and relays 1230 and 1250 being two of the ten "tens" relays required for a full hundred lines. The contacts of these relays are assumed to be connected to a 20-trunk P. B. X group of trunks.

In Figure 13, at the upper left is shown a group of P. B. X trunk access relays associated with this connector and other connectors in the same group. Therein, an "access" relay such as 1310 and 1320 is provided for each connector in the group, relay 1310 for example, being associated with the connector of Figures 9, 10, 11 and 12, which is assumed to be the first connector of the group, and relay 1320 being associated with the rectangle 1305 which is assumed to be the last connector in the group. These relays operate momentarily from the associated connector on a call to the 20-trunk P. B. X group and extend the tens and units marking conductors from the calling switch to the special P. B. X trunk select relays shown on the right of this figure. Relay 1330 is a "lockout" relay which operates when any access relay in the group operates, to cut off the other access relays momentarily and relay 1335 is a normally operated "blocked call" relay which is arranged to release if a call should happen not to switch through promptly to an available trunk, and cause a busy signal to be given to the calling party. At the lower right in Figure 13 are shown the trunk select relays for the 20-trunk P. B. X group, comprising a "preselect" relay such as 1340 for each trunk in the group. These relays, not all of which are shown are connected to the test conductors of the associated P. B. X line circuits and operate therefrom whenever the corresponding trunk is taken into use to prepare the selection of the next idle trunk, by connecting suitable ground markings to a common set of tens and units marking conductors. There is no progressive operation involved, as in Figures 7 and 8, and the selection is therefore on a first idle trunk basis, at all times.

The description of the apparatus involved, and the general method of operation having now been completed, a more complete understanding of the invention will be had, by briefly tracing one or more calls through each of the two systems, the connector system being considered first.

*Calls to trunks through 200-line connector*

To make a call to the first 20-trunk trunk group associated with the 200-line connector of Figures 1 to 4, which will be assumed to be trunks to a distant toll operator, a calling subscriber has only to remove his receiver or handset and dial the single digit "0".

Upon removal of the receiver, a relay-type linefinder not shown, operates quickly to find the calling line, and extends it to an associated connector, such as that of Figures 1 to 4. The connector line relay 110 thereupon operates, from ground through a winding of a dial tone transformer, not shown, on the dial tone conductor 287 at the upper right in Figure 2, through break contacts 271 and 261, conductor 123, upper winding of relay 110, break contacts 121 and 101, talking conductor 108, through the finder to the calling telephone and back to the talking conductor 109, break contacts 102 and 122 and the lower winding of relay 110 to battery. Line relay 110 upon operating, at make contacts 111 operates pulsing relay 130, from ground at break contacts 163, and relay 130 in turn at make contacts 131 closes a locking circuit for itself, and at make contacts 132 operates release relay 140. Release relay 140 then at make contacts 141 prepares a priming circuit for the line relay, at make contacts 143 prepares a circuit for pulsing control relay 150, and at make contacts 142 operates hold relay 160.

Hold relay 160 upon operating, at make contacts 161 closes a point in the busy tone circuit, at make contacts 162 passes ground from contacts 142 back over the test conductor 113, to clear the calling line line relay from the line in preparation for dialling, at break contacts 163 opens the original operate circuit for pulsing relay 120 now locked up to itself through resistor 118 and contacts 131, and at make contacts 163 connects locking ground to conductors 134 and 144. Hold relay 160 also, at contacts 164 closes an additional circuit to the release relay 140, at contacts 165 prepares the pulsing circuit, at contacts 166 prepares the circuit of the switching relay 250, at contacts 167 grounds the hold conductor 114 to lock up the finder, at contacts 168 connects locking ground to conductor 147, and at break contacts 169 busies this link at the link allotter, not shown, and causes the latter to preselect the next idle link. Finally relay 160 at make contacts 169A grounds the tone start conductor 117 to start the tone equipment, not shown. The tone equipment thereupon impresses dial tone on the dial tone conductor 287, and this tone is immediately made audible at the receiver of the calling telephone over the previously traced operate circuit for the connector line relay. If the tone equipment is already in operation from another source, dial tone will pass back to the calling line immediately upon the closing of contacts 161.

The calling party, upon hearing the dial tone proceeds to dial the single-digit call number "0," whereupon the connector line relay restores and re-operates ten times. At each release, make contacts 111 open the circuit of pulsing relay 130 which restores, make contacts 112 open one of the circuits to the release relay 140, and break contacts 112 close the priming circuit for the line relay by way of make contacts 141 and resistor 117. Only enough current flows over this circuit however, to prepare the line relay to reoperate quickly. At each release of pulsing relay 130 its make contacts 131 remove ground from its own locking circuit, while break contacts 131 close a circuit to pulsing control relay 150 which operates to prepare a circuit for the re-operation of relay 130. Pulsing relay 130 also, at break contacts 132 closes the pulsing circuit, and at make contacts 132 momentarily opens the circuit of release relay 140, which however, being made slow to release, as by the use of a copper sleeve over the core, remains operated during the pulsing. At each re-operation of line relay 110, make contacts 111 again operate pulsing relay 130, this time from ground at make contacts 151, while break made contacts 112 open the line relay priming circuit, and re-energize the release relay. The re-operation of the pulsing relay 130, at break-made contacts 131 releases pulsing control relay 150 and re-closes its own locking circuit, and at break-made contacts 132 opens the pulsing circuit and places another ground on the release relay 140.

At each closure of the pulsing circuit, ground from back contacts 132 passes through break contacts 106, make contacts 165, conductor 145, break contacts 244 and left on conductor 205 to Figure 3, where it passes through contacts 33, 23 and 13 on the counting control relays for the successive operation of the counting relays. A branch of this circuit also extends from break contacts 244 to dialling transfer relay 290 which accordingly operates on the first pulse, and, being made slow to release through the use of a copper sleeve on the core, remains operated until shortly after the last pulse of the digit when it restores. Counting relay 310 also operates on the first pulse and at its inner and outer make contacts respectively prepares circuits for relays 10 and 320. On the break of the pulse, a ground shunt is removed from relay 10 which operates in series with relay 310 over the following circuit; ground at make contacts 163, break contacts 171 and 105, conductor 144, break contacts 243, conductor 204 to Figure 3, break contacts 24, relay 10, inner make contacts on relay 310, and the winding of 310 to battery. Relay 10 at make contacts 13 further prepares the circuit of relay 320, which operates on the second pulse, and on the break of the pulse, relay 20 operates in series therewith and opens break contacts 24 to release relays 10 and 310. Relays 330 and 30 operate similarly on the third pulse, releasing 320 and 20, relays 340 and 10 operate on the fourth pulse, releasing 330 and 30, and so on in known manner, until at the end of the tenth and last pulse, counting relay 300 and counting control relay 10 are locked operated, and all of the other register relays are normal.

Shortly after the last pulse, dialling transfer relay 290 releases and closes break contacts 291, 292, and 293, thereby passing ground from conductor 135 to conductors 2, 3 and 8 leading to the counting relays. The ground thus placed on conductors 2 and 3 is without effect due to encountering only open contacts at the counting relays, but the ground on conductor 8 causes the operation of the trunk access relays 510 and 520 in Figure 5. The complete circuit for the operation of these relays is as follows; ground at make contacts 163 on the hold relay, conductor 134, conductor 215 to Figure 3, make contacts 15, conductor 214 back to Figure 2, conductor 135 right, break contacts 292, 262, 273, 272 and 291, conductor 8 through cable 225, outer make contacts 305 on counting relay 300, conductor 484, cable 495, windings of relays 510 and 520 in parallel, break contacts 523 and 553, make contacts 561, break contacts 544 and 524 and similar contacts on the intervening access relays not shown, and resistor 519 to negative battery.

Access relay 510 upon operating, at make contacts 512 to 518 extends the units marking and busy conductors from Figure 4 to the trunk group relays in the upper part of Figure 6, while access relay 520 at make contacts 525 and 526 extends the tens marking or "group operate" conductors for relays 430 and 450 to Figure 6 in like manner. Relay 520 also at preliminary make contacts 522 locks both relays to battery at resistor 519, at break contacts 523 opens the original operate circuit, and at break contacts 524 opens the operate and locking circuits of all of the access relays behind it in the chain. Finally relay 510 at contacts 511 causes the operation of lockout relay 550 in obvious manner, while relay 520 at contacts 521 grounds conductor 555 for the operation of the group select relays 610 and 620. Lockout relay 550, at break contacts 551 and 553 and other similar contacts indicated only by a pair of dotted contacts, opens additional points in the operate circuits of all of the associated access relays to prevent the operation of any further relays at this time, and at break contacts 554 opens the circuit of kickoff relay 560. The latter relay is made slow to release however, as by the use of a copper sleeve over the core at the heel end, and ordinarily remains operated, since under normal conditions its circuit is interrupted very briefly.

Trunk group relays 610 and 620 in response to the grounding of conductor 555 operate in parallel from battery at resistor 655 by way of break contacts 622 and 652, break contacts 643 and 623 and similar contacts on the other trunk group relays not shown, and break contacts 661 to resistor 655. Relay 610 at contacts 611 prepares the kickoff or "blocked call" circuit, and at contacts 612 to 618 extends the units marking and busy conductors to the trunk select relays of Figures 7 and 8. Relay 620 at preliminary make contacts 621 locks to battery at resistor 655 independently of break contacts 622, at contacts 622 opens its own operate circuit, at contacts 623 opens the operate and locking circuit of all relays behind it in the chain, at contacts 624 and 625 extends the tens marking conductors to Figures 7 and 8, and at contacts 626 closes a circuit to lockout relay 650 which operates and in turn operates lockout relay 660. Relay 650 also, at make contacts 653 shunts break contacts 661 opened immediately thereafter by relay 660, at break contacts 652 opens the operate circuits of all of the associated trunk group relays to prevent their operation at this time, and at make contacts 651 closes a circuit by way of conductor 662 and make contacts 896 in Figure 8 to a peg count meter, not shown.

Immediately upon the extension of the tens and units marking conductors to the trunk selecting relays, assuming all trunks of the first 20-trunk trunk group to be idle and preselect relay 720 operated as shown, ground from make contacts 721 and 724 of this relay causes the operation of the connector 1—6 units relay 410 and the T200 tens relay 450. The circuit for the 1—6 units relay 410 is from the said contacts 721, over conductor 667, make contacts 613, conductor 566, make contacts 513, conductor 487, cable 495, and the winding of relay 410 to battery. The circuit for the tens relay 450 is from the said contacts 724, conductor 665, make contacts 625, conductor 558, make contacts 526, conductor 481, cable 495, and the winding of relay 450 to battery.

The tens and units relays 450 and 410 upon operating, at their make contacts 453 and 418 extend their own operate grounds to the digit transfer relays 260 and 280 thereby shunting these relays, which now have ground on the other side of their windings, from hold relay ground on conductor 147. Relay 410, also, at make contacts 417 extends ground from conductor 147 to the switch-through relay 100, by way of conductor 219, break contacts 277 and 246, and conductor 153.

Switch-through relay 100 operates over this circuit and at make-before-break contacts 101 and 102 disconnects line relay 110 from the calling line and extends the said calling line through to the first trunk of the called trunk group clear of attachments, by way of conductors 126 and 129, break contacts 401 and 402, make contacts 411 and 412, and make contacts 454 and 455. This causes seizure of the trunk repeater which returns talking battery to the calling line, and also returns ground over its test conductor to make contacts 456, whence it passes by way of make contacts 413, break contacts 403, conductor 139 and make contacts 103 to the calling line test conductor 113. It also causes the release of the connector line relay 110, pulsing relay 130 and release relay 140. The hold relay 160 remains locked to repeater ground on the test conductor 113 however. Switch-through relay 100 further, at break contacts 104 and 107 opens the circuits of the busy and switching relays 240 and 250, at break contacts 106 opens the pulsing circuit preparatory to the release of the pulsing relay 130, and at break contacts 105 removes ground from conductor 144, thereby opening the locking circuit of the counting relays.

The operated register relays 10 and 300 thereupon release and open the circuit of access relays 510 and 520 which also release. Relay 510 in turn releases lockout relay 550, while relay 520 releases trunk group relays 610 and 620, and these in turn release lockout relays 650 and 660. The release of trunk access relays 510 and 520 also opens the operate circuits of the operated connector tens and units relays 450 and 410. This removes the ground shunt from the transfer relays 260 and 280 and these relays operate in series with the said relays 450 and 410, locking the latter operated.

The seizure of the #1 trunk also causes the associated trunk repeater to open the normally closed circuit of the trunk busy relay 710, which relay accordingly restores, and causes the second preselect relay to operate from ground at back contacts of make-before-break springs 883 and similar contacts on the other preselect relays of Figures 7 and 8, break contacts 711, make contacts corresponding to contacts 731 and the second trunk busy relay, not shown, winding of the second preselect relay, not shown, to battery through break contacts 891 and resistor 893. The second preselect relay upon operating, at make-before-break contacts corresponding to contacts 742 closes an alternate operate circuit for itself and opens its original operate circuit, and at make-before-break contacts corresponding to contacts 743, closes a locking circuit for itself and opens the locking circuit or preselect relay 720, which immediately releases. The second preselect relay also, at make contacts corresponding to contacts 741 and 745 puts marking ground on the 2—7 units marking conductor 668 and the T200 tens marking conductor 665, so that the next call to this trunk group will be automatically extended to the second trunk. In like manner, a third call will be directed to the third trunk and so on, even though prior trunks may have become idle in the meantime. The sixth to the tenth preselect relays, in addition to marking the proper units, marking conductor and the T200 tens marking conductor, also, at make contacts corresponding to contacts 761 and 781 place a ground marking on the units-switching conductor 666, for the operation of the units-switching relay 400, which relay locks to ground on conductor 147, and reverses its contacts 401, 402 and 403. The trunk select relays of Figure 8 operate similarly, with the exception however, that these preselect relays, at their lower make contacts, such as 825 and 845, ground the T290 tens marking conductor 664 to prepare the operation of the tens relay 430, and thus preselect the second ten trunks.

Upper the seizure of the last trunk, here assumed to be the 20th, the release of trunk busy relay 870 reverses contacts 871, thereby causing the operation of reset 890, from make contacts 883. Reset relay 890 thereupon at break contacts 892 momentarily opens the circuit of the slow to release all-trunks-busy relay 895, and at break contacts 891 removes negative battery from all of the preselect relays, thereby causing the release of the operated preselect relay 880. Relay 880 in turn, at make contacts 883 opens the circuit of reset relay 890 which also restores and recloses the circuit of relay 895 before the latter has had time to release. At the same time, assuming the 1st trunk to be again idle and relay 710 operated, break contacts 883 close a circuit for the reoperation of preselect relay 720, and the cycle repeats. If the 1st trunk is still busy however, relay 720 will not operate due to the open make contacts 711, but the preselect relay associated with the first idle trunk will operate instead, and the cycle will repeat from that point. If no idle trunks are available of course, no preselect relays will operate, and reset relay 890 will remain operated from ground at break contacts 883, through break contacts 863 and similar contacts on the other preselect relays, and break contacts 711 and similar contacts on the other trunk busy relays. Relay 895 will now release after a short delay and at break contacts 898 will close a circuit to an all-trunks-busy meter, not shown.

Should any further calls be attempted to this trunk group with all trunks busy, no tens or units relays will operate in the connector, since all of the preselect relays are normal, but ground from make contacts 651 on conductor 662 will pass through break contacts 896 and cause the operation of an overflow meter, not shown, while ground from break contacts 897 will pass back to the connector and operate the busy relay 240 therein. This circuit is by way of busy conductor 672, make contacts 618 or the equivalent on the operated trunk group relays, conductor 572 and make contacts 518 or the equivalent on the operated trunk access relays, busy conductor 492 or the equivalent to the calling connector, where it passes by way of conductor 139, break contacts 283, conductor 137, break contacts 104, conductor 136, and the winding of relay 240 to battery.

Busy relay 240 upon operating, at make contacts 242 locks to ground on conductor 134, and at make contacts 241 connects busy tone from conductor 288 to the calling line, through the low capacity condenser 158, make contacts 161 and the talking condenser 157. Relay 240 also at break contacts 246 opens a point in the circuit of the switch-through relay 100, at break contacts 245 disables the switching relay, at break contacts 244 opens the pusing circuit, and at break contacts 243 opens the locking circuit for the counting relays. The operated register relays thereupon release and in turn restore the operated trunk access and trunk group relays, so as to free the trunk selecting equipment.

In the case of a blocked call, where with idle trunks available in the called group a call is not switched through promptly, the trunk access relays will not restore, and after a short delay, kickoff relay 560 will release. Make contacts 561 will thereupon open another point in the operate circuits of all of the associated access relays, while break contacts 562 ground the kickoff conductor 556, and break contacts 563 ground the busy conductor 572. The ground on the busy conductor passes back to the connector and operates the busy relay therein, while the ground on the kickoff conductor passes by way of conductor 663 and make contacts such as 723 on the operated preselect relay to the next preselect relay which operates and releases the first relay. The connector busy relay gives busy tone to the calling party and frees the trunk selecting equipment in the same manner just described for an all-trunks-busy condition. The calling party on hearing the busy tone, will hang up and try again after an interval, whereupon the call will be directed to the next trunk, and probably through a different connector or link, as well.

In the case of a call to the first 20-trunk group from the last connector 565 of the first group of connectors, the action is similar to that described for a call from the first connector, except that in this case access relays 530 and 540 will operate over the cable 574 and will extend the tens and units marking and busy conductors from connector 565 to the contacts of trunk group relay 610, which operates from make contacts 541. If two connectors in the first connector group attempt calls to this trunk group simultaneously, the lower numbered connector will seize the access relays first and the other connector will be forced to wait until the access relays are freed by the first call. Since the action of trunk selecting is very fast however, such delay would be imperceptible to the calling party in most cases.

In the case of a call to the first 20-trunk group from the second or last group of connectors, the calling connector, such as 570 or 575, will seize the associated trunk access relays 585 by way of cables such as 576 or 578. Trunk access relays 585 in turn cause the operation of trunk group relays 630 and 640 over cable 674, and trunk access relays 585 and trunk group relays 630 and 640 co-operate to extend the control conductors of the calling switch through to the trunk select relays. If a connector in each group of connectors attempts a call to this trunk group at the same time, the call from the lower numbered connector group will seize the trunk group relays first, and the other call with be delayed slightly, until the trunk group relays are freed by the first call.

To call the second 20-trunk group, the calling party will dial the single digit call number "8," whereupon the digit register will count off eight steps, leaving relays 20 and 380 operated in Figure 3. Upon the release of dialling transfer relay 290 therefore, shortly after the last pulse, it causes seizure of trunk access relays 580 over the following circuit; ground at make contacts 163, conductors 134 and 215, to Figure 3, make contacts 25 and conductor 214, conductor 135 right, break contacts 292, 262, 273, 272 and 291, conductor 8 through cable 225 to Figure 3, make contacts 385, and conductor 485 through the cables 495 and 573 to the rectangle 580. The trunk access relays 580 in turn seize trunk group relays 690 over cable 680. The operated trunk access and trunk group relays thereupon extend the units marking and busy conductors and the second pair of tens marking conductors such as conductors 482 and 483 of the calling connector, through to the trunk select relays 695. If the preselected trunk is in the first ten, trunk select relays 695 will in addition to operating the proper units relays in the connector, also pass ground to the tens marking conductor 483 for the operation of the T280 tens relay, not shown. And if the preselected trunk is in the second ten, trunk select relays 695 will pass ground back to tens marking conductor 482 for the operation of the T270 tens relay, not shown. Calls from the second connector group to the second 20-trunk group are handled similarly, except for the use of trunk access relays 590 instead of access relays 580.

It should be understood that the choice of tens relays assigned to trunk groups used herein is merely typical and that the location of these tens relays need not correspond to the trunk call number used. For instance, the digits "0" or "8" could just as readily be made to control tens relays T210 and T220 or T310 and T320 or any other tens relays instead of the relays indicated in the foregoing paragraphs. For ease of installation and maintenance however, it is preferable in most cases to have the call numbers correspond with the number or position of the tens relays operated, as is assumed to be the case in this description.

*Call to local subscribers through 200-line connector*

To show how calls to subscribers' lines are handled by this connector just as readily as calls to trunk lines, let it be assumed that the first large trunk group consists of something less than twenty trunks, and that subscriber lines are connected to the unused terminals of tens relay T290. Let it also be further assumed that the line connected to the bottom terminals of this relay is a 20-party line, and that a call is to be made to a station on this line having the call number "2902." The first digit "2" of this call number indicates that the wanted line is in the first hundred lines and that the code signal of the wanted station is in the first ten codes, the second digit "9" indicates that the wanted line is connected to the ninth tens relay of this group, the third digit "0" indicates that the wanted line is connected to the last terminals of this relay, and the last digit "2" that the signal of the wanted station is the second code.

When this connector is seized by such a call, the connector line, pulsing, release and hold relays 110, 130, 140, and 160 operate in the same manner as for a call to a trunk, to prepare the pulsing circuit and to give dial tone to the calling party. The calling party, upon hearing the dial tone, proceeds to dial the call number "2902" in the usual manner. The line and pulsing relays 110 and 130 in response to the first digit "2," release and re-operate twice, with break springs 132 passing two impulses over the previously traced pulsing circuit to the counting relays, by way of conductors 145 and 205. The digit register thereupon counts off two steps, leaving the register relays 20 and 320 operated. Dialling transfer relay 290 operates as before on the first pulse, and releases shortly after the last pulse.

Upon the release of dialling transfer relay 290 following the first digit "2," break contacts 291, 292, and 293 thereof again pass ground from conductor 135 to conductors 2, 3 and 8. This time, the ground on conductors 2 and 8 is without effect, since these conductors are now open at the springs of the counting relays. The ground on conductor 3 however, passes through contacts on the operated counting relay 320 and causes the operation of the hundreds group select relay 60, the complete circuit for this relay being as follows: ground at make contacts 163, conductors 134 and 215, make contacts 25 in Figure 3, conductor 214, conductor 135 right, break contacts 292, 262 and 273, conductor 3 through cable 225, make contacts 323, conductor GS2 and the winding of relay 60 to battery.

Hundreds group select relay 60 upon operating, at its right-hand break-make contacts prepares operate circuits for a portion of the tens relays associated with the lines and trunks of the first hundreds group. In this connection, it should be noted that the tens relays T260 to T200 of the first hundreds group are connected to front contacts of relay 60, and that the tens relays T210 to T250 of the first hundreds group are connected to back contacts of relay 50. Similarly the tens relays T360 to T300 of the second hundreds group are connected to back contacts on relay 60, while tens relays T310 to T350 of the second hundreds group are connected to front contacts on relay 50. Thus, with relay 60 operated and relay 50 normal, any tens relay in the first hundreds group may be operated, while with relay 60 normal and relay 50 operated, any tens relay of the second hundreds group may be operated, from the counting relays.

Hundreds group select relay 60 also, at its left inner make contacts 62 extends its own operate ground over conductor 226 to the "1st digit transfer" relay 270, thereby shunting this relay, which has hold relay ground on the other side of its winding, from conductor 147. Finally relay 60 at its left outer make contacts 61 closes a circuit to register release relay 170 as follows: ground on conductor 147, in Figure 2, conductor 228, make contacts 61, conductor 227, break contacts 276 and 264, conductor 152, and the lower winding of relay 170 to battery. Relay 170 operates over this circuit and at break contacts 171 opens the locking circuit of the operated register relays 20 and 320, which restore. The release of relay 320 removes the operate ground from conductor GS2 and relay 60. This in turn removes the ground shunt from the 1st digit transfer relay 270 which thereupon operates quickly in series with relay 60 and holds the latter operated. Relay 270, at make-before-break contacts 271 disconnects dial tone from conductor 123 and replaces it with direct ground to hold the line relay, at break contacts 272 disconnects conductor 8, at break-make contacts 273 disconnects conductor 3 and connects up conductor 5 in its place, and at break-make contacts 274 disconnects conductor 2 and connects up conductor 4 in its place. Relay 270 also, at break contacts 276 opens the circuit of register release relay 170 thereby releasing this relay, at break contacts 277 disconnects the switch-through relay 100 to prevent its operation, and at make contacts 276 and 277 prepares further circuits for register release relay 170.

When the calling party dials the second digit "9" of the call number, dialling transfer relay 290 again operates and the register relays count off nine steps, leaving relays 30 and 390 operated. Upon the release of relay 290 therefore, shortly after the last pulse, break contacts 292 and 293 of this relay pass ground from conductor 135 to conductors 4 and 5. Conductor 5 is open at this time at the counting relays, but the ground on conductor 4 passes through make contacts 394 to conductor 190, through the second outer right hand make contacts on relay 60 to conductor T290', which is assumed to terminate in the dotted conductor T290' at the lower right in Figure 4, and thence to the tens relay 430 which operates.

Tens relay 430 upon operating over this circuit at its lower make contacts prepares circuits to the associated trunk lines and subscriber lines, at make contacts 433 extends its operate ground to the "2nd digit transfer" relay 260 thereby shunting this relay, and at make contacts 432 extends ground from conductor 147 to register release relay 170, by way of conductor 218, make contacts 276, break contacts 264 and conductor 152. Relay 170 thereupon operates, and releases the operated register relays. This in turn disconnects operate ground from tens relay 430, which permits relay 260 to operate in series with 430 and lock the latter operated, over conductor 216. Relay 260 at break-make contacts 262 and 263 disconnects conductors 5 and 4, and connects up conductors 7 and 6. Relay 260 also, at break contacts 264 opens the circuit of register release relay 170 which restores, at make contacts 265 grounds the ringing machine start conductor 118 by way of conductor 208 and contacts 195, and at make contacts 266 prepares a circuit for the unit switching relay 400.

When now, the calling party dials the third digit "0" of the call number "2902," dialling transfer relay 290 operates on the first pulse as before, and the register relays count off ten steps, leaving relays 10 and 300 locked operated. On the sixth step of the counting relays, the units switching relay 400 is operated "on the run" from relay 360 over the following circuit: ground at make contacts 163, conductors 134 and 215, make contacts 366, conductor 1 through cable 225, make contacts 266, break contacts 286, conductor 224, and the winding of relay 400 to battery. Relay 400 upon operating, reverses its contacts 401, 402 and 403, and at contacts 404 locks to ground on conductor 147. Upon the release of dialling transfer relay 290 following the last pulse of the digit, break contacts 292 and 293 of this relay connect ground from conductor 135 to conductors 7 and 6. Conductor 6 is now open at the counting relays, but the ground on conductor 7 causes the operation of the 5—0 units relay 420, by way of make contacts 304 on the tenth counting relay and the conductor 406.

The 5—0 units relay 420 upon operating, extends the connector talking and test conductors 126, 129 and 139 to the called line by way of make contacts 401, 402 and 403, make contacts 424, 425 and 426, and make contacts 437, 438 and 439. Relay 420 also, at make contacts 428 extends its own operate ground to the "3rd digit transfer" relay 280, thereby shunting this relay, and at make contacts 427 extends ground from conductor 147 to register-release relay 170, by way of conductor 219, make contacts 277, break contacts 285, and conductor 152. Relay 170 releases the operated register relays, and this in turn opens the operate circuit of units relay 420. This removes the shunt from transfer relay 280 and this relay thereupon operates in series with relay 420 and locks the latter operated. Relay 280 at break contacts 281 and 282 disconnects conductors 7 and 6, at make contacts 282 prepares a circuit for the ring start or ringing digit transfer relay 190, at break contacts 283 disconnects the busy relay, at make contacts 283 closes a circuit to the switching relay 250, at break contacts 285 opens the circuit of register-release relay 170 which restores, and at break-make contacts 286 transfers conductor 1 from the units switching relay 400 to the ring switching relay 220.

If the called line is busy, the connector busy relay 240 will operate from ground on the test conductor immediately upon the operation of the units relay, and before transfer relay 280 can operate. The circuit for the busy relay is from "busy ground" on the test conductor of the called line, make contacts 439, 426, and 403, conductor 139, break contacts 283, conductor 137, break contacts 104, conductor 136 and the winding of relay 240 to battery. Busy relay 240 upon operating, at make contacts 241 connects busy tone to the calling line, at make contacts 242 locks to conductor 134, at break contacts 243 removes ground from conductor 204 to release the digit register, and at break contacts 245 disconnects the switching relay 250, to prevent its operation.

If the called line is idle, battery from the line equipment will be on its test conductor instead of ground, and the busy relay of course will not operate. Switching relay 250 will however operate from this battery immediately upon the operation of transfer relay 280, through make contacts 283, break contacts 245, upper winding of relay 250, conductor 146, make contacts 166, and break contacts 107 to ground. Relay 250 will thereupon, at make contacts 251 and 252 extend the connection to the called line, at make contacts 253 extend direct ground to the test conductor of the called line to make it busy to other calls, and at make contacts 254 lock through its lower winding to ground on conductor 147. Relay 250 also, at make contacts 255 prepares a circuit to the ring pick up relay 210 and at make contacts 256 prepares a start circuit for the ringing interrupter.

When the calling party dials the final digit "2" of the call number "2902," the digit register of Figure 3 counts off two steps leaving register relays 20 and 320 operated. Upon the release of dialling transfer relay 290 shortly after the last pulse, break contacts 292 and 293 thereof pass ground from conductor 135 to the 4th or ringing digit transfer relay 190, by way of make contacts 263 and 282, conductor 138 and back contacts 193. Relay 190 operates over this circuit and at make contacts 193 locks to ground from make contacts 163. Relay 190 also, at make contacts 191 prepares a circuit for ringing relay 230, and at make contacts 192 connects ground from conductor 134 to one side of pickup relay 210, by way of conductor 215, make contacts 25, conductors 214 and 135 left, make contacts 192, break contacts 182 and conductor 154. Relay 190 also, at make contacts 194 closes a start circuit to the ringing interrupter as follows: ground at make contacts 22 in Figure 3, conductor 206, make contacts 256, conductor 155, contacts 194, start conductor 198 and cable 398 to the ringing interrupter, represented by the rectangle 399. Finally relay 190 at break contacts 195 opens the original start circuit for the ringing machine or ringing generator from make contacts 265 by way of conductor 208. This is without effect at the moment however, since the circuit to conductor 118 is now maintained by way of make contacts 21 in Figure 3 and conductor 199.

The code ringing interrupter, whose form is immaterial as far as this invention is concerned, but which is here assumed to be of the relay type, during each ringing cycle connects coded ground pulses representing the different ringing codes to the coding conductors $R_1$ to $R_{10}$ inclusive, through the cable 398. The ringing interrupter also, at the start of each ringing cycle connects solid negative battery to lockup conductor 209, at the upper left in Figure 3, and a short pulse of negative battery to the PU2 pickup conductor at the immediate left of relay 40, followed shortly by a similar pulse on the PU1 pickup conductor. If relay 40 is operated, the pulse on the PU2 conductor is effective to preselect the second ten codes, which differ from the first ten only by the addition of a single short ring at the beginning of each signal. If relay 40 is normal however, as it is in the present instance, the pulse on the PU2 conductor is ineffective, the first short ring is not transmitted, and the ringing signal will accordingly be selected from among the first ten codes.

When therefore, the interrupter connects negative battery momentarily to the PU1 conductor, it completes a circuit to pickup relay 210, by way of break contacts 41, conductor 207, back contacts of make-before-break springs 213, make contacts 255 and the winding of relay 210 to ground on conductor 154. Ring pickup relay 210 thereupon operates and at make before break springs 213 disconnects conductor 207 and locks to conductor 209. Relay 210 therefore, releases at the end of each ringing cycle and re-operates at the start of the next ringing cycle. Relay 210 when operated, at make contacts 211 connects the ringing relay 230 to the code conductors 196 and 197, and at make contacts 212 short circuits the upper winding of register release relay 170, to make this relay slow to operate, a short circuited winding being similar in effect to a copper sleeve or slug on the core. This is done, because of the possibility, with heavily loaded lines, of condenser kicks from the line during ringing tending to operate back bridge relay 180, which in turn might cause premature ring cut off. In this way, relay 170 is made slow to operate on the last digit of the call number only, and fast to operate on all prior digits, where the brevity of the normal interdigital pause would make slow operation impractical.

Ground pulses corresponding to the second ringing code of the first ten codes now pass to ringing relay 230 by way of coding conductor R2, make contacts 322, conductor 197, make contacts 191, conductor 133 and make contacts 211. Relay 230 follows these pulses and on each operation connects a long or short pulse of ringing current to the called line over the following circuit: "out" terminal of the ringing machine, not shown, to conductor 289 at the upper right in Figure 2, protective lamp resistor 267, break contacts 222, make contacts 233 and 252, negative talking conductor 129 to the called line, through the ringers connected thereto and back over the other side of the line to the positive talking conductor 126, make contacts 251 and 232, and break contacts 221 to ground. The ringers respond to these pulses of ringing current on the line and give the code signal of the called station.

Relay 230 also at each operation, at make contacts 231 completes a circuit for giving ring-back tone to the calling line. A portion of the ringing current passes back to the calling line over this circuit which includes the low capacity condenser 235, contacts 231, conductor 125, talking condenser 157, contacts 122 and 102, conductor 109, the finder and the calling line, conductor 108, contacts 101 and 121, upper winding of relay 110 and conductor 123 to ground at make contacts 261. The portion of the ringing current thus transmitted is made audible in the receiver of the calling telephone as a low tone, to indicate that the called line is being signalled. The ringing current itself is prevented from getting back to the calling line by the open make contacts 101 and 102 on the switch-through relay, as well as the open break contacts 232 and 233 on the ringing relay.

Relay 230 further, at make contacts 234 closes a circuit to drain relay 200, at each operation. Relay 200 accordingly follows the pulsations of relay 230 but due to being made slow to release, as by the use of a copper slug over the heel end of the core, relay 200 remains operated for an instant after each release of relay 230. During this interval, ground and negative battery from make contacts 201 and 202 are connected momentarily across the called line, through back contacts 232 and 233. This drains the condenser charge from the line caused by the ringing voltages, and tends to prevent premature ring cutoff from this source.

When the called station answers, a direct current circuit is set up for the operation of the back bridge relay 180 on the next release of relays 230 and 200, if they are not already released at the time. This circuit is from ground and negative battery through the upper and lower windings of relay 180 over conductors 127 and 128, break contacts 201 and 202, break contacts 232 and 233, make contacts 251 and 252 and conductors 126 and 129 to the called line and through the answering telephone. Relay 180 upon operating, at break contacts 182 releases the pickup relay 210 to stop the ringing, and at make contacts 182 closes a circuit to the now slow to operate register release relay 170, which accordingly operates after a short delay, to release the digit register. This in turn removes ground from conductor 135 and so causes relay 170 to release. Back bridge relay 180 further, at make contacts 181 operates the battery reversing relay 120 and this relay at contacts 121 and 122 reverses the battery feed to the talking conductors 108 and 109 for supervisory or other purposes as required. The talking connection is now complete from calling to called party, through the talking condensers 156 and 157, with relay 110 furnishing talking battery to the calling line, and relay 180 to the called line, and conversation proceeds. If the called party hangs up first, nothing occurs beyond the release of relays 180 and 120, but when the calling party hangs up, line relay 110 restores and releases the connector and also the associated finder.

Calls to other lines and stations are made in similar manner, using different call numbers as required, the first or "hundreds" digit however, being "2," "3," "4" or "5" in all cases, to select the line and code groups as previously mentioned. A first digit "2" for example will select the 1st hundred group and the 1st ten codes, a first digit "3" the 1st hundred lines and the 2nd ten codes, a first digit "4" the 2nd hundred lines and the 1st ten codes, and a first digit "5" the 2nd hundred lines and 2nd ten codes. In the example shown, first digits "1," "6," "7" and "9" are absorbed, by ground on conductors 2 and 3 passing through make contacts 313, 363, 373 or 393 at the counting relays to conductor 179 and the register release relay 170, which operates and releases the register. The second or "tens" digit may be any digit from "1" to "0," subject to the condition that any tens relays used exclusively for trunks will not be connected up to the contacts of the hundreds group select relays 50 and 60 and so cannot be operated from the counting relays. The third or "units" digit and the fourth or "ringing" digit may also be any digit from "1" to "0." If the units digit is above "5," the the units switching relay 400 operates on the sixth pulse as already explained, and if the ringing digit is above "5," the ring switching relay 220 operates similarly on the sixth pulse thereof, by way of conductor 1and make contacts 266 and 286. Relay 220 upon operating locks to conductor 144 and at contacts 221 and 222 reverses the ringing connections so that ringing current is impressed on the positive side of the called line instead of the negative side. For bridged party lines, this is of course immaterial, but where divided lines are desired it permits connecting a portion of the ringers between one side of the line and ground, and the other portion between the other side of the line and ground.

*Calls to P. B. X trunks through 100-line connector*

To make a call to the 20-trunk P. B. X trunk group associated with the 100-line connector of Figures 9 to 12 inclusive, a calling party, after removing his receiver or handset in the usual manner, dials the required three-digit call number, which will be assumed to be "271," of which only the last two apply to the connector.

Upon the initiation of the call, a relay type line-finder not shown, but similar to that shown in the previously mentioned Patent 2,535.764, operates to find the calling line, and extends it to an associated selector not shown, but also similar to that shown in Figures 5, 6, 7 and 8 of the aforesaid Patent 2,535,764. The seized selector then returns dial tone, in known manner, whereupon the calling party proceeds to dial the call number of the wanted P. B. X group. Upon the dialing of the first digit "2" the seized selector responds and extends the call to an idle connector in the 200 group of connectors which will be assumed to be the 100-line connector herein shown in part, in Figures 9 to 12.

When therefore, the selector switches through and extends the calling line to this connector, the register release relay 940 operates momentarily from ground forwarded over the test conductor 904, passing through break contacts 931 on the hold relay. Relay 940, thereupon opens break contacts 941, which are without effect at this time, and at break contacts 942 removes ground from conductor 905 to make this connector busy at the selector trunk-select relays for this connector group, by releasing a corresponding trunk busy relay therein. Line relay 900 also operates upon the seizure of the connector from ground and negative battery through its upper and lower windings over the calling line loop through the finder and selector, talking conductors 902 and 903 and break contacts 911 and 912. Relay 900 in turn operates release relay 920 in obvious manner, and the latter operates hold relay 930.

Hold relay 930 upon operating, at make contacts 937 grounds the tone and timer start lead 907, at make contacts 936 grounds the locking conductor 958, and at break contacts 935 opens another point in the circuit of the connector busying conductor 905, preparatory to the release of relay 940. Hold relay 930 also, at make contacts 934 prepares a circuit for switching relay 1040, at make contacts 933 prepares the pulsing circuit, and at make contacts 932 grounds conductors 947 and 987. Relay 930 further, at break contacts 931 causes the restoration of register-release relay 940 and at make contacts 931 passes ground from make contacts 921 back over test conductor 904 to hold the linefinder and selector.

Upon the dialling of the second digit "7" of the call number line relay 900 releases and re-operates seven times. Upon each release, the circuit of release relay 920 is opened momentarily, but this relay being made slow to release, as by the use of a copper sleeve over its core, remains operated. Upon each release also, back contacts 901 connect ground to the pulsing circuit momentarily, this circuit extending to the counting relays of Figure 11 by way of make contacts 933, break contacts 961, conductor 989 and contacts 94, 84 and 74 of the counting control relays. A branch of this circuit also extends from break contacts 961 by way of conductor 949 to dialling transfer relay 1070, which accordingly operates on the first pulse, and being made slow to release, as by the use of a copper sleeve over its core, remains operated until shortly after the last pulse of the digit, when it restores.

Counting relay 1110 also operates on the first pulse and at make contacts 1114 and 1115, prepares circuits for counting relay 1120 and counting control relay 70, the latter being now shunted by ground on both sides of its winding. Upon the break of the pulse, the opening of the operate circuit of relay 1110 removes ground from the right side of relay 70 which thereupon operates quickly in series with relay 1110, and locks the latter operated, over the following locking circuit: ground at make contacts 932 on the hold relay, break contacts 941, conductor 954, break contacts 1035, conductor 955, break contacts 85, winding of relay 70, make contacts 1115, and the winding of relay 1110 to battery. Relay 70 at make contacts 74 switches the pulsing circuit to the second counting relay 1120, which operates on the second pulse. On the break of the pulse relay 80 operates in series with relay 1120 by way of make contacts 1125, and at make contacts 84 and 85 respectively, switches the pulsing circuit to the third counting relay, and opens the locking circuit of relays 70 and 1110 which restore. Relays 1130 and 90 operate similarly on the third pulse, releasing relays 80 and 1120. In like manner relays 1140 and 70 operate on the fourth pulse, releasing relays 90 and 1130, and so on, until at the end of the seventh and last pulse of the dialled digit, counting relay 1170 and counting control relay 70 are locked operated, and all of the other register relays are normal.

When dialling transfer relay 1070 restores, shortly after the last pulse, break contacts 1072 and 1071 thereof pass ground from conductor 979 to conductors 3 and 2 leading to the springs of the counting relays. The ground on conductor 3 is without effect, due to encountering only open contacts at the counting relays. The ground on conductor 2 however causes the operation of trunk access relay 1310 over a circuit whose complete path may be traced as follows: ground at make contacts 932, conductor 987 to Figure 11, make contacts 71, conductor 979, break contacts 1072, 1071 and 1053, conductor 2, make contacts 1171, conductor 1176 to Figure 12, through cable 1290, winding of relay 1310, break contacts 1312 and 1332, make contacts 1336, break contacts 1323 and 1313 and similar contacts on the intervening access relays, not shown, to negative battery through resistor 1302.

Access relay 1310 upon operating over this circuit, at its lower make contacts extends the tens and units marking conductors from the calling connector to the P. B. X trunk select relays shown at the right in Figure 13, and the busy conductor 1287 to the open break contacts 1337 on the kickoff relay. Relay 1310 also, at preliminary make contacts 1311 locks to battery at resistor 1302, at break contacts 1312 opens its original operate circuit, and at break contacts 1313 opens the operate and locking circuits of all of the access relays behind it in the chain. Relay 1310 further, at make contacts 1314 closes an obvious circuit to lockout relay 1330, which operates. Relay 1330 thereupon, at break contacts 1331 and 1332 and other similar contacts, represented symbolically by a pair of dotted contacts above relay 1330, opens a point in the operate circuit of each of the associated access relays, to further guard against any additional operations at this time, and at break contacts 1333 momentarily opens the circuit to blocked call relay 1335. Relay 1335 being made slow to release, as by the use of a copper slug on the core, remains operated however, under normal conditions. Finally relay 1330 at make contacts 1334 closes a circuit by way of conductor 1306 to a peg count meter, not shown, and connects ground to contacts 1342 at the trunk select relays.

Immediately upon the extension of the tens marking conductors to the trunk selecting relays, assuming all of the P. B. X trunks in the group to be idle and all of the associated preselect relays normal as shown, ground from back contacts 1343 causes the operation of the connector T20 tens relay 1250, by way of make contacts 1313A and conductor 1288 through cable 1290. And immediately upon the operation of lockout relay 1330, ground from make contacts 1334 causes the operation of the connector 1—6 units relay 1210, by way of break contacts 1342, make contacts 1316 and conductor 1282 through cable 1290.

The tens and units relays 1250 and 1210 upon operating extend the connector talking and test conductors 1073, 1074 and 1076 to the 1st P. B. X trunk, by way of break contacts 1201, 1202 and 1203, make contacts 1211, 1212 and 1213, and make contacts 1255, 1256 and 1257. Relays 1250 and 1210 also at make contacts 1254 and 1218 extend their own operate ground to digit transfer relays 1050 and 1060 thereby shunting these relays, which now have ground also on the other side of their windings, from conductor 958. Relays 1250 and 1210 further, at make contacts 1253 and 1217 pass ground from conductor 958 to register release relay 940, by way of conductors 1081 and 1080 and break contacts 1064 and 1052 to conductor 959.

Register release relay 940 thereupon operates over this circuit and at break contacts 941 removes ground from the register lockup conductors 954 and 955. The operated register relays 70 and 1170 accordingly release and open the circuit of trunk access relay 1310 which also restores and releases lockout relay 1330. The release of relay 1310 also opens the operate circuits to the tens and units relays 1250 and 1210. This removes the shunt from transfer relays 1050 and 1060 and these relays quickly operate in series with relays 1250 and 1210 and lock the latter operated. Relays 1050 and 1060, at make contacts 1061 prepare a circuit for switching relay 1040, at make contacts 1063 prepare a circuit for ring switching relay 1010, and at break contacts 1052 and 1064 open the circuit to register release relay 940, which restores. Relays 1050 and 1060 also, at break-make contacts 1053 and 1065 prepare a circuit for the ring start relay 960 and disconnect conductors 2 and 4, at contacts 1054 and 1066 disconnect conductors 3 and 5, and at make contacts 1055 pass ground by way of conductor 978 and break contacts 965 to the ringing machine start conductor 908.

The switching relay 1040 now operates, from battery on the test conductor 1076 from the line equipment of the selected idle trunk, by way of make contacts 1257 and 1213, break contacts 1203, conductor 1076, make contacts 1061, break contacts 1034, upper winding of relay 1040, and conductor 953 to ground at make contacts 934. Relay 1040 thereupon, at make contacts 1041 and 1042, extends the call to the connected P. B. X trunk. Relay 1040 also at make contacts 1043 connects direct ground to the test conductor of this trunk to make it busy to other calls, at make contacts 1044 locks through its lower winding to hold relay ground on conductor 958, at make contacts 1045 closes a point in the circuit of pickup relay 980, and at make contacts 1046 closes a point in the start circuit for the ringing interrupter.

Upon the dialling of the final digit "1" of the call number "271," the relays 1110 and 70 of the digit register of Figure 11 operate and lock. Dialling transfer relay 1070 also operates on the single pulse comprising this digit, and releases shortly thereafter. Upon the re-closure of break contacts 1071 and 1072 therefore, hold relay ground on conductor 979, from make contacts 71 in Figure 11 causes the operation of the ring start relay 960, through said break contacts 1072 and 1071, make contacts 1053 and 1065, conductor 973, and break contacts of the make-before-break springs 962.

Ring start relay 960 upon operating over this circuit, at break contacts 961 opens the pulsing circuit, and at make contacts 962 locks to ground from make contacts 932 on conductor 987. Relay 960 also at make contacts 963 connects the ringing conductors 975 and 986 together, and at make contacts 964 grounds the ringing interrupter start conductor 976, from ground at make contacts 72 in Figure 11, by way of conductor 1107, make contacts 1046 and conductor 977. Relay 960 further at break contacts 965 opens the original circuit to the ringing machine start conductor 908, but this is without effect at the moment, as these springs are now shunted by make contacts 73 in Figure 11, over conductors 978 and 988. Relay 960 finally, at make contacts 966 prepares a circuit for ring pickup relay 980.

During each ringing cycle the ringing interrupter, indicated by the rectangle 1116 in Figure 11, connects negative battery to the "lockup"

conductor 974 at the lower left in Figure 10, and a ground pulse of about one second duration to the "INT1" conductor at the same location. The ringing interrupter also, at the start of each ringing cycle connects a very short pulse of negative battery to the "PU1" conductor in Figure 10. When therefore at the start of the next ringing cycle following the operation of relay 960, the interrupter places negative battery momentarily on the PU1 conductor, it causes the immediate operation of pickup relay 980 by way of break contacts 1014, conductor 969, break contacts 982, conductor 968, make contacts 1045, conductor 967, winding of relay 980, break contacts 952, make contacts 966, conductor 979, make contacts 71 and conductor 987 to ground at make contacts 932.

Pickup relay 980 upon operating over this circuit, at make-before-break contacts 982 disconnects the "PU1" conductor and locks to battery on the "lockup" conductor 974, and at make contacts 981 connects the ringing relay 1020 to the "INT1" conductor. When therefore, the interrupter places the recurrent one second ground pulse on the "INT1" conductor, ringing relay 1020 operates accordingly and at make contacts 1021 and 1023 connects ringing current to the selected P. B. X line to signal the attendant at the P. B. X switchboard in known manner. This ringing current circuit may be traced from the ringing generator not shown, through make contacts on a start relay not shown, in the interrupter 1116, ringing conductor R1, make contacts 1113, conductor 975, winding of ring cutoff relay 1000, break contacts 1012, make contacts 1023 and 1042, negative called line, a line or signal relay for this line at the P. B. X and back over the other side of the line to ground at break contacts 1011. Ringing relay 1020 also at make contacts 1022 connects ringing tone to the calling line from ringing conductor R2 in Figure 11, by way of conductor 983, a very low capacity condenser 1015, make contacts 1022, conductor 944 and the talking condenser 923. Ringing relay 1020 further at make contacts 1024 operates drain relay 970 momentarily.

Ring cutoff relay 1000 is not affected by the ringing current passing through its winding, due to being made sluggish in operation, as by the use of a stiff adjustment and a copper sleeve and a copper slug over the core. If the P. B. X attendant answers while ringing current is on the line however, a direct current circuit is established for relay 1000 which operates after a slight delay, from superimposed negative battery at the ringing generator, through relay 1000 and the called line and the attendant's telephone, and back to ground at break contacts 1011. Relay 1000 upon operating, at make contacts 1001 passes ground from conductor 978 to register release relay 940 which operates and releases register release relays 1110 and 70. Relay 1110 at make contacts 1113 removes the ringing current and battery from the line, thereby permitting the release of relays 1000 and 940. Relay 70 at make contacts 71 also opens the circuit of pickup relay 980 which restores and releases ringing relay 1020. As soon as ringing relay 1020 and drain relay 970 have restored, back bridge relay 950 operates over the called line loop, from ground and battery through its own windings, by way of break contacts 971 and 972, break contacts 1021 and 1023, and make contacts 1041 and 1042. Relay 950 reverses contacts 952 but without effect as these contacts are now dead, and at make contacts 951, passes ground from make contacts 932 to battery reversing relay 910 which operates and reverses battery to the calling line, for supervisory or other purposes as required. The connection is now complete, and conversation may proceed between the calling party and the attendant, who will complete the call as required.

If the P. B. X attendant answers during a silent interval, with the ringing and drain relays normal, back bridge relay 950 will operate at once, and the ring cutoff relay 1000 is not affected, since its circuit is open at the springs of the ringing relay. Back bridge relay 950 on operating over the called line loop as before, at make contacts 951 operates the battery reversing relay 910 as before, at break contacts 952 releases the pickup relay, if it is operated, and at make contacts 952 closes a circuit to register release relay 940 as follows: ground at make contacts 932, conductor 987, make contacts 71, conductor 979, and make contacts 966 and 952 to relay 940 and battery. Relay 940 thereupon operates and releases the register. The register relays in turn open the circuit of relay 940 which restores. The connection is now complete to the P. B. X attendant as before, through the talking condensers 922 and 923, and the call is completed by the attendant in the usual manner.

Returning now to the trunk selecting equipment, the seizure of the 1st P. B. X trunk causes the line equipment thereof to pass ground to the associated preselect relay 1340 in Figure 13 which operates, and advances the marking conductors to the second preselect relay, not shown. Upon the release of the connection, relay 1340 restores, and again preselects the 1st trunk.

Should the next call to this P. B. X be made while the 1st trunk is still in use however, units marking ground from make contacts 1334 passes through make contacts 1342 and break contacts on the second preselect relay not shown, to the U2—7 units marking conductor, while tens marking ground from break contacts corresponding to break contacts 1343 on the second preselect relay not shown, it passes back through make contacts 1343 to the upper tens marking conductor as before. The T80 tens relay and the U2—7 units relay in the calling connector thereupon operate and extend the call to the 2nd P. B. X trunk, whereupon the second preselect relay, not shown, operates and preselects the 3rd trunk.

Further calls to this trunk group, with all previously engaged trunks still busy, are handled in similar fashion, with slight differences as required. On the sixth to tenth calls for example, ground from break contacts corresponding to break contacts 1351 passes back through the preceding make contacts to the units switching conductor and operates the units-switching relay in the calling connector, while the tens relay 1250 and the proper units relays therein operate as before, from break contacts corresponding to 1353 and 1352 and through make contacts on the preceding preselect relays, to extend these calls to the 6th to 10th trunks respectively.

Upon the seizure of the 10th trunk, and the resulting operation of preselect relay 1360, break contacts 1361 remove ground from the units-switching marking conductor, while make contacts 1362 again prepare to ground the 1—6 units marking conductor, by way of break contacts 1366. At the same time, break contacts 1363 remove ground from the upper tens marking conductor, while make contacts 1364 connect ground to the lower tens marking conductor, from break contacts 1367. The second ten calls accordingly cause the operation of the second tens relay such as the T70 tens relay in Figure 12 for the successive selection of the trunks 11 to 20, with the units switching relay coming in as before on the last five calls. Upon the seizure of the last trunk, the operation of preselect relay 1385 causes the disconnection of the last tens and units marking conductors, and at make contacts 1387 prepares an overflow metering circuit.

Any further calls to this P. B. X group, with all trunks engaged, will therefore result in the operation of no tens or units relays in the calling connector, but ground from make contacts 1334 will pass through make contacts 1342, 1352, 1362, 1366, 1387 and similar contacts on the intervening relays to conductor 1307 for the operation of an overflow meter, not shown. Since the connector tens and units relays cannot operate, register release relay 940 cannot operate to release the digit register and the operated trunk access relay. Blocked call relay 1335 accordingly restores, after a short delay, and at make contacts 1336 opens another point in the operate circuit of all of the associated access relays. At the same time at break contacts 1337, relay 1335 causes the operation of the connector busy relay 1030, by way of make contacts such as 1312A on the operated access relay and conductor 1287.

Busy relay 1030 upon operating locks to ground on conductor 947, and at make contacts 1041 connects busy tone from the busy tone conductor 1047 to the calling line, through the low capacity condenser 1025. Relay 1030 also, at break contacts 1034 disconnects the switching relay and at break contacts 1035, digit transfer relays 1050 and 1060 not having operated, opens the locking circuit to the digit register which restores, and releases the operated access relay. This in turn releases lockout relay 1330 and re-operates the blocked call relay 1335, thereby making the trunk access relays available for another call. The calling party on hearing the busy tone, hangs up and tries again later.

If, with idle trunks available in the P. B. X group, a call is still not switched through promptly, following seizure of the trunk access relays, for any reason, the blocked call relay again releases as explained in the preceding paragraph and operates the connector busy relay over the previously traced direct circuit. The calling party is again given the busy tone, and thereupon hangs up and tries again later, when it is likely that a different connector and perhaps also a different trunk will be involved.

*Calls to local subscribers through 100-line connector*

Since with this connector, subscriber lines may not be connected to any unused terminals of the tens relays employed for large trunk groups, let it be assumed that a call is to be made to a subscriber line connected to the T60 tens relay, not shown. Let it be also assumed that this line is a ten-party line, with ringers connected "in bridge," and that the call number of the wanted station on this line is "2668," of which only the last three apply to the connector.

Upon the initiation of the call, an idle line-finder operates as before to find the calling line and extends it to as associated selector, which returns dial tone in known manner. The calling party thereupon dials the first digit "2" of the call number. The seized selector responds to the dial pulses, and extends the call to an idle connector in the 200 group of connectors, which will again be assumed to be the connector shown in Figures 9 to 12.

Upon the seizure of the connector, register release relay 940 operates momentarily as before from ground forwarded over the test conductor 904, passing by way of break contacts 931, and again makes this connector busy at the selector trunk select relays. At the same time, line relay 900 operates over the calling line loop, and causes the operation of the release and hold relays 920 and 930 as before. The hold relay at make contacts 931 passes its own operate ground back over test conductor 904 to hold the finder and selector, and at break contacts 931 opens the circuit of relay 940 which restores.

Upon the dialling of the second digit "6" of the call number, the connector line relay 900 releases and reoperates six times, and passes six pulses to the counting relays, from ground at back contacts 901 by way of make contacts 933, break contacts 961 and conductor 989. The register relays of Figure 11 respond to the pulses and count off six steps, leaving relays 1160 and 90 operated and locked in series. Dialling transfer relay 1070 as usual, operates on the first pulse over conductor 949, and releases shortly after the last pulse, while release relay 920 as usual, remains operated during all of the pulsing.

Upon the release of dialling transfer relay 1070 shortly after the last pulse, ground from make contacts 932 on conductor 987 passes through make contacts 91 in Figure 11, conductor 979 and break contacts 1072, 1071, 1053 and 1054, to conductors 2 and 3. Conductor 2 is open at this time at the springs of the counting relays, but the ground on conductor 3 passes through make contacts 1161 to cause the operation of the T60 tens relay, not shown, which in turn prepares the operation of the tens digit transfer relay 1050, and grounds conductor 1081 for the operation of the register release relay 940, by way of break contacts 1052 and conductor 959.

Register release relay 940 upon operating, at break contacts 941 disconnects hold relay ground from the lockup conductors 954 and 955, thereby causing the release of the operated register relays 90 and 1160. This in turn opens the operate circuit of the T60 tens relay, not shown, and permits relay 1050 to operate in series with this relay and lock it operated, in the same manner as for relays 1230 and 1250. The tens digit transfer relay 1050 upon operating, at make contacts 1051 prepares a circuit for the units switching relay 1200, at break contacts 1052 opens the circuit of register release relay 940 which restores, at break-make contacts 1053 and 1054 disconnects conductors 2 and 3 and connects up conductors 4 and 5, and at make contacts 1055 grounds the ringing machine start conductor.

Upon the dialling of the third digit "6" of the call number "2668," line relay 900 again releases and re-operates six times, and passes six pulses to relay 1070 and the counting relays. Relay 1070 operates on the first pulse and releases after the last pulse, while the register relays count off six steps leaving relays 1160 and 90 operated, as before. This time however, the units switching relay 1200 operates on the sixth step, as soon as counting relay 1160 operates, the circuit for this being from hold relay ground on conductor 987, through make contacts 1164, conductor 984, break contacts 1063, make contacts 1051, conductor 1078 and the upper winding of relay 1200 to negative battery. Relay 1200 upon operating reverses its upper contacts and locks to conductor 958.

Dialling transfer relay 1070 releases shortly after the last pulse, and break contacts 1072 and 1071 pass ground from conductor 979 to conductors 4 and 5, by way of make contacts 1053 and break contacts 1065, and make contacts 1054 and break contacts 1066. Conductor 4 is open at this time at the springs of the counting relays, but the ground on conductor 5 passes through make contacts 1162 and causes the operation of the 1—6 units relay 1210 over conductor 1109.

The 1—6 units relay 1210 upon operating, extends the connector talking and test conductors 1073, 1074 and 1076 to the called line by way of make contacts 1201, 1202 and 1203, make contacts 1214, 1215 and 1216, and the sixth set of line contacts on the T60 tens relay, not shown. Relay 1210 also at make contacts 1218 prepares a circuit for the units digit transfer relay 1060 as before, and at make contacts 1217 extends ground from conductor 958 to register release relay 940, by way of conductor 1080, break contacts 1064 and conductor 959. Relay 940 operates over this circuit to release the operated register relays, and this in turn opens the operate circuit of units relay 1210. Digit transfer relay 1060 thereupon operates, in series with units relay 1210, and locks the latter operated. Relay 1060, at break-make contacts 1061 disconnects the test conductor 1076 from the busy relay 1030 and connects it to the switching relay 1040, and at break-make contacts 1063 disconnects conductor 984 from the units switching relay 1200 and connects it to the ring switching relay 1010. Relay 1060 also, at break contacts 1064 releases the register release relay 940, at break contacts 1065 and 1066 disconnects conductors 4 and 5, and at make contacts 1065 prepares a circuit for the ringing digit transfer relay 960.

If the called line is busy, the connector busy relay 1030 will operate from ground on the test conductor, immediately upon the operation of the units relay, before relay 1060 can operate to open break contacts 1061. Busy relay 1030 upon operating, at make contacts 1032 locks to ground on conductor 947, and at make contacts 1031 connects busy tone from busy tone conductor 1047 to the calling line by way of the low capacity condenser 1025, conductor 944, and the talking condenser 923. Busy relay 1030 also at break contacts 1034 disconnects the switching relay 1040 to prevent its operation, and at break contacts 1035 removes ground from lockup conductor 955 to release the operated register relays.

If the called line is idle however, negative battery will be on the test conductor instead of ground, and the busy relay will not operate. Upon the operation of units digit transfer relay 1060 therefore switching relay 1040 operates from the stated battery on the test conductor, by way of make contacts 1061, break contacts 1034, upper winding 1040 and conductor 953 to ground at make contacts 934. Relay 1040 upon operating, at make contacts 1041 and 1042 extends the connection to the called line, at make contacts 1043 places direct ground on the test conductor, and at make contacts 1045 closes a point in the circuit of the ring pickup relay 980.

Upon the dialling of the fourth digit "8" of the call number, line relay 900 releases and re-operates eight times, and passes eight pulses to relay 1070 and the counting relays, with relay 1070 operating as before on the first pulse. The counting relays in turn, count off eight steps in response to the pulses, leaving register relays 1180 and 80 operated. On the sixth pulse, the ring switching relay 1010 operates "on the run" from relay 1160 over the following circuit: ground from make contacts 932 on conductor 987, make contacts 1164, conductor 984, make contacts 1063, and the lower winding of relay 1010 to negative battery. Relay 1010, at contacts 1011 and 1012 prepares a ringing circuit out over the positive side of the called line, and at contacts 1013 and 1014 disconnects the INT1 and PU1 interrupter leads, and connects up the INT2 and PU2 leads in their place.

When dialling transfer relay 1070 restores, following the last pulse of the ringing digit, the ring-start relay 960 operates from ground on conductor 979, by way of break contacts 1072, 1071, make contacts 1053 and 1065 and conductor 973. Relay 960 locks as before to ground on conductor 987, at make contacts 963 connects conductors 975 and 986 together, at make contacts 964 grounds the interrupter start conductor, and at make contacts 966 connects ground from conductor 979 to one side of the ring pickup relay 980.

In further explanation of the one and two ring interrupter 1116 employed with this connector, and whose construction, while immaterial for the purposes of this invention, is preferably of the relay type, this interrupter while in operation, connects uninterrupted ringing current of five different frequencies to ringing conductors R1 to R10 in Figure 11. Frequency #1 is connected in multiple to conductors R1 and R6, frequency #2 to R2 and R7, frequency #3 to R3 and R8, frequency #4 to R4 and R9, and frequency #5 to R5 and R0. This ringing interrupter also, during each ringing cycle, in addition to connecting negative battery to "lockup" conductor 974, and a one second ground pulse to the INT1 conductor in Figure 10, as previously described for a P. B. X call, at the same time connects two one-second ground pulses spaced about one-half second apart, on the INT2 conductor. This interrupter further, at the start of each ringing cycle connects a short pulse of negative battery to each of the PU1 and PU2 pickup conductors.

When therefore, the ringing interrupter, at the start of the next ringing cycle following the operation of the ring start relay 960, connects negative battery momentarily to the PU2 conductor, ring pickup relay 980 operates over conductors 969, 968 and 967 to ground through break contacts 952 and make contacts 966 and 81. Pickup relay 980, at make before break contacts 982 locks to battery on conductor 974 and disconnects the PU2 conductor, and at make contacts 981 connects the ringing relay 1020 to the INT2 conductor.

When now, the interrupter places the two one-second ground pulses on the INT2 conductor, ringing relay 1020 operates accordingly and connects two short pulses of ringing current of the third frequency to the positive side of the called line, during each ringing cycle. This circuit is from the R8 ringing conductor in Figure 10, through make contacts 1183, conductor 986, make contacts 963, conductor 975, ring cutoff relay 1000, make contacts 1011, 1021 and 1041 to the positive called line, through all of the station ringers in multiple, and back over the negative side of the line to ground through make contacts 1042, 1023 and 1012. Since two stations on this line, one having a one-ring signal and the other having a two-ring signal, have ringers tuned to this frequency, both of these stations will be signalled, and the one having the two-ring signal will answer. Thus, any ringing digit from "6" to "0" will connect two-ring signals of the proper frequency to the called line, while any ringing digit from "1" to "5" will connect one-ring signals of corresponding frequency thereto, through control of the ring switching relay 1010. Ringing over different sides of the line is of course of no moment with bridged ringers, but where grounded 10 party lines are used instead of bridged lines, with half the ringers connected to each side of the line, divided ringing is necessary. In this case, the PU2 and INT2 conductors would be left open at the interrupter, since two-ring signalling would not be required, and the PU1 and INT1 conductors would be strapped to front and back contacts of make-before-break springs 1013 and 1014 of the ring switching relay.

Ringing relay 1020, in addition to actually placing the ringing current on the line, also at make contacts 1022 connects ringing current of frequency #2 to the calling line over a circuit extending from the conductors R2 and 983, through the low capacity conductor 1015, contacts 1022, conductor 944, condenser 923, back contacts 912, through the selector and finder and the calling telephone, where it is made audible in the receiver as a low recurrent one-second tone, and back over the upper side of the line to back contacts 911 and so to ground through the upper winding of relay 900. Relay 1020 further, at each operation, at make contacts 1024 causes the momentary operation of drain relay 970. Drain relay 970 being slow to release, short circuits the called line momentarily at make contacts 971 and 972 following each release of relay 1020, to drain off the ringing voltages from the line, as is desirable with heavily loaded party lines, to prevent the accumulation of high voltages, and possible premature ring cutoffs.

When the called party answers, if ringing current is on the line at the time, ring cutoff relay 1000 operates over the called line loop from superimposed battery at the ringing generator, to ground at make contacts 1012. Relay 1000 thereupon at make contacts 1001 operates register release relay 940, from ground at make contacts 1055. This releases the register which thereupon disconnects ringing current from the called line. Thus permitting the release of the ring cutoff and register release relays. The release of relay 80 also at make contacts 81 removes ground from conductor 979 and make contacts 966, thus causing the release of pickup relay 980. Relay 980 thereupon at make contacts 981 opens the circuit of ringing relay 1020 which restores and releases drain relay 970. As soon as relays 1020 and 970 are fully restored to normal, back bridge relay 950 operates over the called line loop, and operates battery reversing relay 910. The connection is now complete with talking battery furnished by the relays 900 and 950 in normal manner. If the called party answers during a silent period, back bridge relay 950 operates at once, and at break contacts 952 disconnects the pickup relay 980, releasing it if operated. Relay 950 also at make contacts 951 operates relay 910 as before, and at make contacts 952 operates the register release relay 940, which releases the register.

The description having now been completed, what is considered new and is desired to have protected by Letters Patent is set forth in the following claims.

What is claimed is:

1. In a telephone system, a plurality of relay type switches, units relays and a first and a second group of group relays each group comprising at least two group relays in each of said switches, contacts on said relays, a first and a second trunk group each having a different call number and the trunks thereof connected respectively and individually to the contacts of the corresponding group of group relays in each of said switches, a corresponding first and second group of trunk select relays common to said switches for preselecting idle trunks in the corresponding trunk group one at a time, a first and a second group of group marking conductors and a group of units marking conductors for each switch for controlling the said group and units relays thereof, an impulse register in each switch for causing the first group of group marking conductors and the units marking conductors thereof to be extended to said first group of trunk select relays on a call in response to impulses representing the call number of said first trunk group and for causing the second group of group marking conductors and the units marking conductors thereof to be extended to said second group of trunk select relays on a different call in response to impulses representing the call number of said second trunk group, means in each said group of trunk select relays for causing the operation of one of the group relays in the corresponding group of group relays and one of the units relays in such calling switch over such extended conductors to extend the call through the contacts of such operated group and units relays to the preselected trunk in the called trunk group, means for making contemporaneous extensions of said marking conductors from different ones of said switches to different ones of said groups of trunk select relays, and means to block the making of contemporaneous extensions of said marking conductors from different ones of said switches to the same group of trunk select relays.

2. In a telephone system, a first and a second group of relay type switches with a plurality of switches in each switch group, units relays and a first and a second group of tens relays in each switch each group comprising at least two tens relays, contacts on said relays, a first and a second multi-trunk trunk group each having a different call number, the trunks of each group being connected respectively to the contacts of said first and second groups of tens relays in each switch, a first and a second group of trunk select relays common to said switches for preselecting idle trunks in the corresponding first and second trunk groups one at a time in a definite order, a first and a second group of tens marking conductors corresponding respectively to said first and second tens relay groups and a group of units marking conductors for each switch, an impulse register in each of said switches for causing the extension of the first group of tens marking conductors and the units marking conductors of any calling one of said switches to said first group of trunk select relays on a call responsive to the dialling of said first trunk group call number to such calling switch and for causing the extension of the second group of tens marking conductors and the units conductors thereof to said second group of trunk select relays on another call responsive to the dialling of said second trunk group call number to such switch, means for thereupon operating any one of the tens relays of the corresponding tens relay group and any one of the units relays of such switch from such trunk select relays over such extended conductors in accordance with the location of the preselected trunk on the contacts of said tens relays to extend the call to such preselected trunk through the contacts of such operated tens and units relays, means for making contemporaneous extensions of said marking conductors from different ones of said switch groups to different ones of said trunk select relay groups, means for making contemporaneous extensions of said marking conductors from different switches of the same switch group to different ones of said trunk select relay groups, and means to block the making of contemporaneous extensions of said marking conductors from different ones of said switches and switch groups to the same trunk select relay group.

3. In a telephone system, a first and a second group of relay type switches with a plurality of switches in each switch group, units relays in each switch, a first and a second group of tens relays in each switch with a plurality of tens relays in each group, a first and a second multi-trunk trunk group each having a different single digit call number, a different portion of the trunks of each said trunk group being accessible to each of the tens relays of the corresponding group of tens relays in each switch, a first and a second group of trunk access relays for each of said switch groups each comprising an access relay for each switch of the associated switch group, a first and a second group of trunk group relays each comprising a group relay for each of said switch groups, a first and a second group of trunk select relays corresponding to said trunk groups for preselecting idle trunks in the corresponding trunk group one at a time, means in each switch responsive to impulses representing the call number of said first trunk group for operating the access relay corresponding to the calling switch in the first group of trunk access relays associated with the calling switch group and for causing the operation of the group relay corresponding to the calling switch group in the first group of trunk group relays, control conductors extended by such operated access and group relays from the calling switch to said first group of trunk select relays, means for thereupon automatically operating a tens relay in the first group of tens relays of the calling switch and a units relay therein to extend the call to the preselected idle trunk of the first trunk group, means in each switch responsive to impulses representing the call number of said second trunk group for operating the access relay corresponding to the calling switch in the second group of trunk access relays associated with the calling switch group and for causing the operation of the group relay corresponding to the calling switch group in the second group of trunk group relays associated with the calling switch group, control conductors extended by such operated access and group relays from the calling switch to said second group of trunk select relays, means for thereupon automatically operating a tens relay in the second group of tens relays of the calling switch and a units relay therein to extend the call to the preselected idle trunk in the second trunk group, means responsive to such extension of the call by calling switch to release the access and group relays previously operated thereby, and means for causing only one said access relay and one said group relay to be operated at the same time in any one of said groups of trunk access and trunk group relays.

4. In a telephone system, a relay type switch, tens and units relays and a busy relay therein, a group of twenty trunks accessible to two of said tens relays and all having the same single digit-call number, a group of trunk select relays external to said switch comprising a select relay for each of said trunks, means for automatically operating said select relays one at a time to preselect the idle ones of said trunks in a definite sequence, control conductors for said switch for operating the said two tens relays and the said units relays thereof and a busy conductor for operating the said busy relay, means responsive to the dialling of said call number to said switch on a call to said trunk group for causing said control and busy conductors to be connected to said trunk select relays, means for thereupon operating either of said two tens relays and any one of said units relays from said trunk select relays over said control conductors in accordance with the setting of said select relays to extend the call to the preselected trunk, and means for operating said busy relay from said trunk select relays over said busy conductor in case all of said trunks are busy to block the extension of the call and to give a busy signal.

5. In a telephone system as in claim 4 means responsive to both the extension of the call and the operation of the busy relay for causing the disconnection of said control and busy conductors from said trunk select relays.

6. In a telephone system, a relay type switch, group and units relays therein, contacts on said relays, a busy relay in said switch, a group of P. B. X lines exceeding ten accessible to said switch, said P. B. X lines having a common plural digit call number and connected individually and separately to the contacts of a plurality of said group relays, group and units marking conductors and a busy conductor for said switch, line selecting equipment for preselecting idle ones of said lines, means in said switch responsive to received impulses representing said call number for seizing said line selecting equipment momentarily, means responsive to such seizure for causing the operation of one of the group relays and one of the units relays of said switch from said line selecting equipment over said marking conductors to complete a connection to a preselected idle one of said P. B. X lines, through the contacts of said operated relays, means to prevent the operation of any of said group and unit relays on such a call in case all of said P. B. X lines are busy, and timing means in said line selecting equipment responsive to such non-operation for causing the energization of said busy conductor to operate said busy relay.

7. In a telephone system, a relay type connector switch, units relays and a busy relay for said switch, a first and a second group relay for said switch, contacts on said group relays, a group of private branch exchange trunk lines exceeding ten and all having the same plural digit call number connected individually to the contacts of said first and second group relays, group and units operate conductors and a busy conductor for said switch, line selecting equipment for preselecting idle ones of said trunk lines, means in said switch responsive to the dialling of said call number thereto for seizing said line, selecting equipment, means responsive to such seizure for operating either of said group relays and any of said units relays from said line selecting equipment over said operate conductors to complete a connection to the preselected idle line, means in said line selecting equipment for operating said busy relay over said busy conductor on such a call in cases where all of the trunk lines are busy, and for operating said busy relay over said busy conductor on such a call in cases where with one or more idle trunk lines available the connector fails to complete the connection promptly, and means in said switch responsive both to the completion of the connection and to the operation of said busy relay, for releasing said line selecting equipment.

8. In a telephone system, a relay switch, a 1st and a 2nd pair of tens relays in said switch, a 1st group of trunks a portion of which are accessible to each of said 1st pair of relays, a 2nd group of trunks a portion of which are accessible to each of said 2nd pair of relays, a 1st trunk preselecting unit individual to said 1st trunk group for controlling the extension of a call from said switch to a preselected idle trunk in said 1st trunk group, a 2nd trunk preselecting unit individual to said 2nd trunk group for controlling the extension of a call from said switch to a preselected idle trunk in said 2nd trunk group, a 1st pair of conductors individually connected to said 1st pair of relays over which said relays are operated, a 2nd pair of conductors individually connected to said 2nd pair of relays over which said relays are operated, means for extending said 1st pair of conductors to said 1st preselecting unit for operating either of said first pair of relays therefrom dependent on the trunk preselected when said 1st group of trunks is called, and means for extending said 2nd pair of conductors to said 2nd preselecting unit for operating either of said 2nd pair of relays therefrom dependent on the trunk preselected whenever said 2nd group of trunks is called.

9. In a telephone system, a relay switch, a 1st, a 2nd and a 3rd tens relay in said switch, a large group of trunks a separate portion of which is accessible to each of said 1st and 2nd tens relays and a small group of trunks accessible to said 3rd tens relay, trunk preselecting equipment external to said switch for controlling the extension of a call from said switch to a trunk in either of said trunk groups dependent on the trunk group called, conductors individually connected to each of the said tens relays over which said relays are operated, the conductors individual to said 1st and 2nd tens relays extending to said trunk preselecting equipment and individually controlled therefrom to extend calls to said large trunk group, and the conductor individual to said 3rd tens relay confined wholly within said switch and controlled therefrom to extend calls to said small trunk group.

10. In a telephone system, a relay type switch, tens and units relays in said switch, a group of more than ten trunks accessible to said switch and having only one call number, a different portion of said trunks accessible to each of said tens relays, trunk selecting equipment normally disconnected from said switch and comprising a select relay for each trunk in said trunk group for preselecting said trunks for use one at a time in a definite order, operate conductors for each of said tens and units relays, means in said switch responsive to received impulses representing said call number for momentarily extending said operate conductors to said trunk selecting equipment, and contacts on said select relays for operating any one of said tens relays and any one of said units relays over the corresponding ones of said extended conductors responsive to such extension to complete a connection through said switch to any trunk in said trunk group, as preselected by said trunk selecting equipment.

11. In a telephone system, a relay type switch, units relays and a first and a second tens relay in said switch, contacts on said relays, a group of trunks from eleven to twenty in number connected individually to the contacts of said tens relays with a different portion of said trunks connected to each relay but all having the same call number, relay type trunk selecting equipment normally disconnected from said switch and controlled from said trunks for preselecting the next idle one of said trunks to be used in extending a connection, an operating circuit for each of said tens and units relays, relay means in said switch operated responsive to impulses representing said call number received by said switch during the establishment of a connection for seizing said trunk selecting equipment and extending said operating circuits thereto, circuit means in said trunk selecting equipment for energizing certain of said extended operating circuits responsive to such seizure for operating either of said tens relays and any one of said units relays in accordance with the trunk preselected to extend the connection through the contacts of such operated tens and units relays to such preselected trunk, and circuit arrangements in said switch responsive to such extension of the connection for freeing said trunk selecting equipment.

12. In a telephone system, a relay switch, units relays and a pair of tens relays in said switch for extending calls, contacts on said relays, a large group of trunk lines connected separately and individually to different contacts on said tens relays and a subscriber line connected to other contacts on one of said tens relays, with all of said trunk lines having the same call number and said subscriber line a different number, relay type trunk selecting equipment external to said switch for preselecting the idle ones of said trunks for use one at a time, a first set of normally disconnected operate circuits for said tens and units relays in said trunk selecting equipment, a second set of operate circuits for said relays entirely within said switch, relay means in said switch operative in response to received impulses representing said trunk group call number for seizing said selecting equipment to cause said first set of operate circuits to be connected to said switch, any one of said units relays and either of said tens relays operated over said first set of operate circuits in response to said connection and in accordance with the trunk preselected to extend the call through the contacts of said operated tens and units relays to such preselected trunk, and said relay means also operative in response to received impulses representing said subscriber number for operating one of said units relays and said one tens relay over said second set of operate circuits to extend the call through the contacts of said last operated tens and units relays to said subscriber line.

JOHN H. VOSS.

(References on following page)

REFERENCES CITED

The following references are of record in the file of this patent:

UNITED STATES PATENTS

| Number | Name | Date |
| --- | --- | --- |
| 2,022,503 | Evers | Nov. 26, 1935 |
| 2,252,309 | Voss | Aug. 12, 1941 |
| 2,325,151 | Saunders | July 27, 1943 |
| 2,325,877 | Powell | Aug. 3, 1943 |
| 2,333,039 | Peterson | Oct. 26, 1943 |
| 2,340,554 | Peterson | Feb. 1, 1944 |
| 2,416,131 | Voss | Feb. 18, 1947 |
| 2,431,850 | Voss | Dec. 2, 1947 |